United States Patent
Wang et al.

(10) Patent No.: US 12,250,703 B2
(45) Date of Patent: Mar. 11, 2025

(54) DATA TRANSMISSION METHOD, CENTRALIZED UNIT, AND DISTRIBUTED UNIT

(71) Applicant: HUAWEI TECHNOLOGIES CO., LTD., Shenzhen (CN)

(72) Inventors: Hong Wang, Beijing (CN); Yan Wang, Beijing (CN); Baokun Shan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 354 days.

(21) Appl. No.: 17/707,244

(22) Filed: Mar. 29, 2022

(65) Prior Publication Data
US 2022/0225354 A1 Jul. 14, 2022

Related U.S. Application Data

(63) Continuation of application No. PCT/CN2019/109649, filed on Sep. 30, 2019.

(51) Int. Cl.
H04W 72/52 (2023.01)
H04W 72/1268 (2023.01)

(52) U.S. Cl.
CPC ....... *H04W 72/52* (2023.01); *H04W 72/1268* (2013.01)

(58) Field of Classification Search
CPC ............. H04W 72/52; H04W 72/1268; H04W 74/0833; H04W 74/006
See application file for complete search history.

(56) References Cited

U.S. PATENT DOCUMENTS

2017/0163470 A1* 6/2017 Seo .......... H04W 4/70
2022/0201794 A1* 6/2022 Fujishiro ............... H04W 76/27

FOREIGN PATENT DOCUMENTS

| CN | 103763748 A | 4/2014 |
|---|---|---|
| CN | 110050502 A | 7/2019 |
| CN | 110139386 A | 8/2019 |
| CN | 110149725 A | 8/2019 |
| WO | 2019035434 A1 | 2/2019 |

OTHER PUBLICATIONS

Nokia, Nokia Shanghai Bell, Further analysis on Performance and Feasibility of service based GWUS. 3GPP TSG-RAN WG2 Meeting #106, Reno, USA, May 13-May 17, 2019, R2-1906622, 3 pages.
China Unicom, Orange, China Telecom, Revised WID: eNB(s) Architecture Evolution for E-UTRAN and NG-RAN. 3GPP TSG RAN Meeting #80, La Jolla, CA USA, Jun. 11-14, 2018, RP-181375, 4 pages.
Ericsson, MT early data in Msg4. 3GPP TSG-RAN WG2 #105bis, Xi An, China, Apr. 8-12, 2019, R2-1903829, 8 pages.
Samsung, KT, SK Telecom, F1 interface setup and the delivery of gNB-DU capability. 3GPP TSG-RAN WG3 Meeting #96, Hangzhou, P.R.China, May 15-19, 2017, R3-171703, 4 pages.

\* cited by examiner

*Primary Examiner* — Khoa Huynh
(74) *Attorney, Agent, or Firm* — HAUPTMAN HAM, LLP

(57) ABSTRACT

A data transmission method includes receiving, by a centralized unit (CU), a first message from a distributed unit (DU). The first message includes a first transport block size (TBS) threshold. The first TBS threshold is useable for early transmission of uplink data. The method further includes sending, by the CU, the first TBS threshold to a UE, and receiving, by the CU, uplink data from the UE based on the first TBS threshold.

18 Claims, 18 Drawing Sheets

DATA TRANSMISSION METHOD, CENTRALIZED UNIT, AND DISTRIBUTED UNIT

CROSS-REFERENCE TO RELATED APPLICATIONS

This application is a continuation of International Application No. PCT/CN2019/109649, filed on Sep. 30, 2019, which is hereby incorporated by reference in its entirety.

TECHNICAL FIELD

This application relates to the field of network communications, and in particular, to a data transmission method, a centralized unit, and a distributed unit.

BACKGROUND

In conventional network communication, base stations in 5G new radio (New Radio, NR) and a long term evolution (Long Term Evolution, LTE) system include a base station in a centralized architecture. The centralized base station architecture includes a radio resource control (RRC, radio resource control) protocol layer, a packet data convergence protocol (PDCP, packet data convergence protocol) layer, a radio link control (RLC, radio link control) protocol layer, a multiple access control protocol (MAC, multiple access control protocol) layer, and a port physical layer (PHY, port physical layer). Different protocol layers have different functions, and interaction between the different protocol layers is usually implemented in a base station, that is, protocol layers in the base station may perform data interaction in the same base station.

A small data packet (uplink and/or downlink) may need to be transmitted between the base station and user equipment (User Equipment, UE) in the centralized base station architecture. The small data packet specifically indicates data with a small data volume, for example, a heartbeat packet, a message pushed by a server, data sent by a user, or data for refreshing a user status. The small data packet may be sent through early data transmission, to reduce signaling overheads caused by a service setup procedure in a system. For example, enhanced machine type communication (enhanced Machine Type Communication, eMTC) and narrowband internet of things (Narrowband Internet of Things, NB-IoT) communication technologies currently support early transmission of uplink data (Mobile Originated Early Data Transmission, MO-EDT), early transmission of downlink data (Mobile Terminated EDT, MT-EDT), and data transmission based on a pre-configured uplink resource (Pre-configured Uplink Resource, PUR).

An early data transmission method is implemented as follows: First, a MAC layer in a base station needs to determine a transport block size (transport block size, TBS) threshold. Then, an RRC layer in the base station obtains the TBS threshold through internal interaction in the base station, and the RRC layer may send the TBS threshold to UE. If the RRC layer in the base station determines that a data volume of to-be-sent downlink data is not greater than the TBS threshold, early data transmission may be performed through MT-EDT. If the UE determines that a data volume of to-be-sent uplink data is not greater than the TBS threshold, early data transmission may be performed through MO-EDT or based on a PUR. The TBS threshold used for the MT-EDT may be different from the TBS threshold used for the MO-EDT or the PUR.

However, another base station architecture, namely, a distributed architecture, that is, a base station including a centralized unit (centralized unit, CU) and a distributed unit (distributed unit, DU) is proposed, to implement baseband resource sharing and radio access slicing and cloudification. In a CU-DU separation scenario, a PHY layer, a MAC layer, and an RLC layer that have a high real-time requirement are placed in the DU, and a PDCP layer and an RRC layer that have a low real-time requirement are placed in the CU, that is, the MAC layer and the RRC layer are not on a same device/unit. A TBS threshold needs to be determined by the MAC layer responsible for resource scheduling, but the RRC layer cannot accurately determine the TBS threshold, and UE cannot obtain the TBS threshold either. As a result, implementation of an early data transmission function is affected.

SUMMARY

Embodiments of this application provide a data transmission method, a centralized unit, and a distributed unit, to implement early data transmission in a CU-DU separation scenario.

A first aspect of embodiments of this application provides a data transmission method, including: In a network architecture in which a centralized unit CU and a distributed unit DU are separated, the DU determines a first transport block size TBS threshold that needs to be used when user equipment UE performs early transmission of uplink data. The CU receives a first message sent by the DU, where the first message includes the first TBS threshold. Then, the CU sends the first TBS threshold to the UE, so that the UE can determine, based on the first TBS threshold, whether early transmission of uplink data can be used. The UE sends uplink data to the CU through early transmission of uplink data when the UE determines, based on the first TBS threshold, that early transmission of uplink data can be used. In this way, the CU obtains, from the first message sent by the DU, the first TBS threshold used for early transmission of uplink data, and sends the first TBS threshold to the UE, so that the UE sends the uplink data to the CU through early transmission of uplink data based on the first TBS threshold, thereby implementing early data transmission in a CU-DU separation scenario.

It should be noted that, a process in which the UE sends the uplink data to the CU through early transmission of uplink data may be a process in which the UE sends the uplink data to the CU through MO-EDT, or may be a process in which the UE sends the uplink data to the CU based on a PUR.

In addition, the CU can be connected to the UE by using the DU, that is, data interacted between the CU and the UE can be forwarded by using the DU. Specifically, a process in which the CU sends the first TBS threshold to the UE may be that the CU sends, to the UE by using the DU, the first TBS threshold used for early transmission of uplink data. The process in which the UE sends the uplink data to the CU through early transmission of uplink data may be that the DU forwards the uplink data to the CU after the UE sends the uplink data to the DU.

According to the first aspect of embodiments of this application, in a first implementation of the first aspect of embodiments of this application, the method may further include: The CU may receive a second TBS threshold sent by the DU, where the second TBS threshold is used for early transmission of downlink data. Specifically, before the CU receives the second TBS threshold sent by the DU, the CU can first send a request message to the DU to request for the second TBS threshold. In addition, the second TBS threshold can also be carried in a cell-level limitation message sent by the DU to the CU. Further, the cell-level limitation message may further be included in a configuration update message sent by the DU to the CU, so that when the CU finds that there is downlink data for the UE, the CU uses the second TBS threshold as a basis for determining whether the downlink data is transmitted through early transmission of downlink data.

According to the first aspect of embodiments of this application, in a second implementation of the first aspect of embodiments of this application, the method may further include: The CU receives a first indication sent by the DU, where the first indication is used to indicate early transmission of uplink data. Specifically, it can be learned from the first aspect that, the process in which the UE sends the uplink data to the CU through early transmission of uplink data may be as follows: After the UE sends the uplink data to the DU, the DU sends the uplink data to the CU. In this case, the DU may include the first indication in the uplink data when sending the uplink data to the CU. The first indication is used to indicate early transmission of uplink data, so that the CU can determine that the uplink data is transmitted through early transmission of uplink data.

According to the first implementation or the second implementation of the first aspect of embodiments of this application, in a third implementation of the first aspect of embodiments of this application, the CU receives initial uplink RRC message transfer sent by the DU, where the initial uplink RRC message transfer includes the second TBS threshold and/or the first indication. Specifically, the CU can receive, in a plurality of manners, the initial uplink RRC message transfer sent by the DU. For example, the CU can receive the initial uplink RRC message transfer sent by the DU on a control plane (CP, control plane) side, or can receive the initial uplink RRC message transfer sent by the DU on a user plane (UP, user plane) side. In this way, the CU can obtain the second TBS threshold and/or the first indication by using one message.

According to the third implementation of the first aspect of embodiments of this application, in a fourth implementation of the first aspect of embodiments of this application, if the initial uplink RRC message transfer includes the second TBS threshold or the first indication, the CU sends a UE context setting request to the DU. Specifically, for example, in the third embodiment of the first aspect of embodiments of this application, the CU can receive, in a plurality of manners, the initial uplink RRC message transfer sent by the DU. The CU can receive, by using a CP solution, the initial uplink RRC message transfer sent by the DU, or can receive, by using an UP solution, the initial uplink RRC message transfer sent by the DU. When the CU receives, by using the CP solution, the uplink data sent by the DU, the CU receives first initial uplink RRC message transfer sent by the DU, where the first initial uplink RRC message transfer can include the uplink data and the second TBS threshold. In this case, the CU can directly obtain the uplink data from the first initial uplink RRC message transfer. When the CU receives, by using the UP solution, the uplink data sent by the DU, the DU encapsulates an RRC message in a first initial uplink RRC message and sends a first initial uplink RRC message including the RRC message to the CU. When determining that the first initial uplink RRC message can further include the second TBS threshold and/or the first indication, the CU determines that there is the uplink data that needs to be uploaded in the DU. After receiving the second initial uplink RRC message, the CU sends the UE context setting request message to the DU, so that the DU establishes the UE context based on the message, and then sends the uplink data to the CU. In this way, the CU can obtain the uplink data uploaded by the UE.

According to any one of the first aspect of embodiments of this application or the first to the fourth implementations of the first aspect of embodiments of this application, in a fifth implementation of the first aspect of embodiments of this application, the CU sends a second indication to the DU, where the second indication is used to indicate early transmission of uplink data or early transmission of downlink data. For example, before the CU receives the first TBS threshold or the second TBS threshold sent by the DU, the CU can send the DU a message for requesting for the first TBS threshold or the second TBS threshold. The second indication is used to indicate early transmission of uplink data or early transmission of downlink data, so that the DU can determine that the CU has a threshold requirement for early transmission of uplink data or early transmission of downlink data, and then the DU sends the preset first TBS threshold or the preset second TBS threshold to the CU. In addition, when the CU needs to send the downlink data to the UE, a specific sending manner may be that the CU sends the downlink data by using the DU. In this case, the CU may include the second indication in the downlink data sent to the DU, so that the DU determines that the downlink data is transmitted through early transmission of downlink data.

According to the fifth implementation of the first aspect of embodiments of this application, in a sixth implementation of the first aspect of embodiments of this application, the CU sends a second message to the DU, where the second message may carry an RRC message and the second indication, and the second message includes downlink RRC message transfer or a UE context release command Specifically, after the CU receives the uplink data sent by the UE based on the first TB S threshold, when the CU determines that there is the downlink data for the UE and determines, based on the second TBS threshold, that the downlink data can be transmitted through early transmission of downlink data, the CU can send the second message to the DU. The second message can carry the RRC message and the second indication, the RRC message can include the downlink data, and the second indication is used to indicate that the downlink data is transmitted through early transmission of downlink data. In addition, when the CU sends the second message by using a CP solution, the second message is the downlink RRC message transmission transfer. When the CU sends the second message by using an UP solution, the second message is the UE context release command.

According to the fifth implementation or the sixth implementation of the first aspect of embodiments of this application, in a seventh implementation of the first aspect of embodiments of this application, the CU receives a third indication sent by the DU, where the third indication is used to indicate failure of early transmission of uplink data, or fallback of early transmission of uplink data, or failure of early transmission of downlink data, or fallback of early transmission of downlink data. It can be learned from the first aspect that, the process in which the UE sends the uplink data to the CU through early transmission of uplink data may be as follows: After the UE sends the uplink data to the DU, the DU forwards the uplink data to the CU. When the DU determines that the uplink data uploaded by the UE to the CU does not conform to early transmission of uplink data, the DU sends the third indication to the CU. In this case, the third indication can indicate failure of early transmission of uplink data, or fallback of early transmission of uplink data, so that the CU and the DU subsequently establish the UE context to transmit the uplink data. In addition, after the CU receives the uplink data sent by the UE through early transmission of uplink data, when the CU determines that there is the downlink data that needs to be sent to the UE, the CU can send the downlink data to the DU, or the DU determines, based on a data volume of the downlink data, whether to transmit the downlink data through early transmission of downlink data. If the DU determines that the downlink data cannot be transmitted through early transmission of downlink data, the DU sends the third indication to the CU. In this case, the third indication can indicate failure of early transmission of downlink data, or fallback of early transmission of downlink data.

A second aspect of embodiments of this application provides a data transmission method, including: In a network architecture in which a centralized unit CU and a distributed unit DU are separated, the DU determines a first transport block size TBS threshold that needs to be used when user equipment UE performs early transmission of uplink data. The distributed unit DU sends a first message to the centralized unit CU, where the first message includes a first transport block size TBS threshold, and the first TBS threshold is used for early transmission of uplink data, so that the CU sends the first TBS threshold to the UE. Then, the DU receives uplink data sent by the UE. The DU sends the uplink data to the CU when the DU determines that the UE sends the uplink data through early transmission of uplink data. In this way, the DU sends the first TBS threshold used for early transmission of uplink data to the CU by using the first message, so that after the CU sends the first TBS threshold to the UE, the UE can send the uplink data to the DU through early transmission of uplink data based on the first TBS threshold, and the DU sends the uplink data to the CU, thereby implementing early data transmission in the CU-DU separation scenario.

It should be noted that, a process in which the UE sends the uplink data to the CU through early transmission of uplink data may be a process in which the UE sends the uplink data to the CU through MO-EDT, or may be a process in which the UE sends the uplink data to the CU based on a PUR.

According to the second aspect of embodiments of this application, in a first implementation of the second aspect of embodiments of this application, the DU sends a second TBS threshold to the CU, where the second TBS threshold is used for early transmission of downlink data. Specifically, the DU can trigger, based on a request message from the CU, to send the second TBS threshold to the CU. In addition, the second TBS threshold can also be carried in a cell-level limitation message sent by the DU to the CU. Further, the cell-level limitation message may further be included in a configuration update message sent by the DU to the CU, so that when the CU finds that there is downlink data for the UE, the CU uses the second TBS threshold as a basis for determining whether the downlink data is transmitted through early transmission of downlink data.

According to the second aspect of embodiments of this application, in a second implementation of the second aspect of embodiments of this application, the DU sends a first indication to the CU, where the first indication is used to indicate early transmission of uplink data. Specifically, in the second aspect, the DU can send the CU the uplink data including the first indication, so that the CU can determine that the uplink data is data sent by the UE through early transmission of uplink data.

According to the first implementation or the second implementation of the second aspect of embodiments of this application, in a third implementation of the second aspect of embodiments of this application, the DU may send initial uplink RRC message transfer to the CU, where the initial uplink RRC message transfer includes the second TBS threshold and/or the first indication. Specifically, the DU can send, in a plurality of manners, the initial uplink RRC message transfer to the CU. For example, the CU can receive the initial uplink RRC message transfer sent by the DU on a control plane (CP, control plane) side, or can receive the initial uplink RRC message transfer sent by the DU on a user plane (UP, user plane) side. In this way, the CU can obtain the second TBS threshold and/or the first indication by using one message.

According to the third implementation of the second aspect of embodiments of this application, in a fourth implementation of the second aspect of embodiments of this application, if the initial uplink RRC message transfer includes the second TBS threshold or the first indication, the CU sends a UE context setting request to the DU. Specifically, for example, in the third embodiment of the second aspect of embodiments of this application, a process in which the DU sends the initial uplink RRC message transfer to the CU can be implemented in a plurality of manners. The DU can send the initial uplink RRC message transfer by using a CP solution, or can send the initial uplink RRC message transfer by using an UP solution. When the DU sends, by using the CP solution, the uplink data to the CU, the DU sends first initial uplink RRC message transfer to the CU, where the first initial uplink RRC message transfer can include the uplink data and the second TBS threshold. In this case, the CU can directly obtain the uplink data from the first initial uplink RRC message transfer. When the CU receives, by using the UP solution, the uplink data sent by the DU, the DU encapsulates an RRC message in a first initial uplink RRC message and sends a first initial uplink RRC message including the RRC message to the CU. When determining that the first initial uplink RRC message can further include the second TBS threshold and/or the first indication, the CU determines that there is the uplink data that needs to be uploaded in the DU. After receiving the second initial uplink RRC message, the CU sends the UE context setting request message to the DU, so that the DU establishes the UE context based on the message, and then sends the uplink data to the CU. In this way, the CU can obtain the uplink data uploaded by the UE.

According to any one of the second aspect of embodiments of this application and the first to the fourth implementations of the second aspect of embodiments of this application, in a fifth implementation of the second aspect of embodiments of this application, the DU receives a second indication sent by the CU, where the second indication is used to indicate early transmission of uplink data or early transmission of downlink data. For example, before the CU receives the first TBS threshold or the second TBS threshold sent by the DU, the CU can send the DU a message for requesting for the first TBS threshold or the second TBS threshold. The second indication is used to indicate early transmission of uplink data or early transmission of downlink data, so that the DU can determine that the CU has a threshold requirement for early transmission of uplink data or early transmission of downlink data, and then the DU sends the preset first TBS threshold or the preset second TBS threshold to the CU. In addition, when the CU needs to send the downlink data to the UE, a specific sending manner may be that the CU sends the downlink data by using the DU. In this case, the CU may include the second indication in the downlink data sent to the DU, so that the DU determines that the downlink data is transmitted through early transmission of downlink data.

According to the fifth implementation of the second aspect of embodiments of this application, in a sixth implementation of the second aspect of embodiments of this application, the DU receives a second message sent by the CU, where the second message may carry an RRC message and the second indication, and the second message includes downlink RRC message transfer or a UE context release command Specifically, after the CU receives the uplink data sent by the UE based on the first TBS threshold, when the CU determines that there is the downlink data for the UE and determines, based on the second TBS threshold, that the downlink data can be transmitted through early transmission of downlink data, the CU can send the second message to the DU. The second message can carry the RRC message and the second indication, the RRC message can include the downlink data, and the second indication is used to indicate that the downlink data is transmitted through early transmission of downlink data. In addition, when the CU sends the second message by using a CP solution, the second message is the downlink RRC message transmission transfer. When the CU sends the second message by using an UP solution, the second message is the UE context release command.

According to the fifth implementation or the sixth implementation of the second aspect of embodiments of this application, in a seventh implementation of the second aspect of embodiments of this application, the CU receives a third message sent by the DU, where the third indication is used to indicate failure of early transmission of uplink data, or fallback of early transmission of uplink data, or failure of early transmission of downlink data, or fallback of early transmission of downlink data. It can be learned from the first aspect that, the process in which the UE sends the uplink data to the CU through early transmission of uplink data may be as follows: After the UE sends the uplink data to the DU, the DU forwards the uplink data to the CU. When the DU determines that the uplink data uploaded by the UE to the CU does not conform to early transmission of uplink data, the DU sends the third indication to the CU. In this case, the third indication can indicate failure of early transmission of uplink data, or fallback of early transmission of uplink data, so that the CU and the DU subsequently establish the UE context to transmit the uplink data. In addition, after the CU receives the uplink data sent by the UE through early transmission of uplink data, when the CU determines that there is the downlink data that needs to be sent to the UE, the CU can send the downlink data to the DU or the DU determines, based on a data volume of the downlink data, whether to transmit the downlink data through early transmission of downlink data. If the DU determines that the downlink data cannot be transmitted through early transmission of downlink data, the DU sends the third indication to the CU. In this case, the third indication can indicate failure of early transmission of downlink data, or fallback of early transmission of downlink data.

A third aspect of embodiments of this application provides a data transmission method, including: In a network architecture in which a centralized unit CU and a distributed unit DU are separated, when the CU has downlink data to be sent to target UE, the CU may send the downlink data to the target UE through early transmission of downlink data. The CU sends a first indication to the DU, where the first indication may include an indication about downlink data to the target UE, so that when the DU determines that the target UE is within a service range of the DU, the CU can receive an identifier of the target UE sent by the DU. In this way, the CU can send the downlink data to the target UE by using an MSG2 or an MSG4 through early transmission of downlink data, thereby implementing early transmission of downlink data in the CU-DU separation scenario.

According to the third aspect of embodiments of this application, in a first implementation of the third aspect, that the CU sends the first indication to the DU may specifically include: The CU sends a paging message to the DU, where the paging message includes the first indication. Specifically, the CU determines, in a plurality of manners, the downlink data to be sent to the target UE. For example, the CU sends the downlink data to the target UE in a plurality of manners. For example, the CU may generate the downlink data sent to the target UE, or the CU may determine, according to an indication of a core network device, to send the downlink data to the target UE. The indication of the core network device is a first paging message sent by the core network device. In this case, the CU may send, to the DU based on the first paging message sent by the core network device, the paging message that carries the first indication.

According to the third aspect of embodiments of this application or the first implementation of the third aspect of embodiments of this application, in a second implementation of the third aspect of embodiments of this application, the CU may receive a first TBS threshold sent by the DU, where the first TBS threshold is used for early transmission of downlink data. Specifically, before the CU sends the downlink data to the target UE through early transmission of downlink data, the CU can further determine, based on the first TBS threshold, whether the downlink data is sent through early transmission of downlink data. If the downlink data is sent through early transmission of downlink data, the CU sends the downlink data through early transmission of downlink data.

According to the third aspect of embodiments of this application and the first or second implementation of the third aspect, in a third implementation of the third aspect of embodiments of this application, the indication about the downlink data to the target UE includes a data volume of the downlink data. The downlink data indication sent by the CU to the DU may include the data volume of the downlink data, so that the DU can determine, based on the data volume of the downlink data, whether the downlink data can be transmitted through early transmission of downlink data, to obtain a determining result. Then the DU sends the determining result to the CU as the indication message, so that the CU determines, based on the indication message, whether to send the downlink data to the target UE through early transmission of downlink data.

A fourth aspect of embodiments of this application provides a data transmission method, including: In a network architecture in which a centralized unit CU and a distributed unit DU are separated, when there is downlink data to be sent to target UE, the CU may send the downlink data to the target UE through early transmission of downlink data. The DU receives a first indication sent by the CU, where the first indication includes an indication about downlink data to the target UE. When the target UE is within a service range of the DU, the DU sends an identifier of the target UE to the CU, so that the CU can send the downlink data to the target UE by using an MSG2 or an MSG4 through early transmission of downlink data, thereby implementing early transmission of downlink data in the CU-DU separation scenario.

According to the fourth aspect of embodiments of this application, in a first implementation of the fourth aspect of embodiments of this application, that the DU receives the first indication sent by the CU may specifically include: The DU receives a paging message sent by the CU, where the paging message includes the first indication. In other words, the paging message can carry the first indication, and this provides a specific implementation for implementing the solution.

According to the fourth aspect of embodiments of this application or the first implementation of the fourth aspect of embodiments of this application, in a second implementation of the fourth aspect of embodiments of this application, the method may further include: The DU sends a first TBS threshold to the CU, where the first TBS threshold is used for early transmission of downlink data. Specifically, the first TBS threshold can assist the CU in subsequent determining Before the CU sends the downlink data to the target UE through early transmission of downlink data, the CU can further determine, based on the first TBS threshold, whether the downlink data is transmitted through early transmission of downlink data. If the downlink data is transmitted through early transmission of downlink data, the CU sends the downlink data through early transmission of downlink data.

According to the fourth aspect of embodiments of this application and the first or second implementation of the fourth aspect, in a third implementation of the fourth aspect of embodiments of this application, the indication about the downlink data to the target UE includes a data volume of downlink data. In other words, the downlink data indication that is received by the DU and that is sent by the CU can include the data volume of the downlink data, so that the DU can determine, based on the data volume of the downlink data, whether the downlink data can be transmitted through early transmission of downlink data, to obtain a determining result. Then the DU sends the determining result to the CU as the indication message, so that the CU determines, based on the indication message, whether to send the downlink data to the target UE through early transmission of downlink data.

A fifth aspect of embodiments of this application provides a centralized unit CU. The CU has a function of implementing the method in any one of the first aspect or the possible implementations of the first aspect, or any one of the third aspect or the possible implementations of the third aspect. The function may be implemented by hardware, or may be implemented by hardware executing corresponding software. The hardware or software includes one or more modules corresponding to the functions, for example, a receiving unit and a sending unit.

A sixth aspect of embodiments of this application provides a distributed unit DU. The DU has a function of implementing the method in any one of the second aspect or the possible implementations of the second aspect, or any one of the fourth aspect or the possible implementations of the fourth aspect. The function may be implemented by hardware, or may be implemented by hardware executing corresponding software. The hardware or software includes one or more modules corresponding to the functions, for example, a receiving unit and a sending unit.

A seventh aspect of embodiments of this application provides a centralized unit CU. The CU includes at least one processor, a memory, a transceiver, and computer-executable instructions that are stored in the memory and can run on the processor. When the computer-executable instructions are executed by the processor, the processor performs the method in any one of the first aspect or the possible implementations of the first aspect, or any one of the third aspect or the possible implementations of the third aspect.

An eighth aspect of embodiments of this application provides a distributed unit DU. The DU includes at least one processor, a memory, a transceiver, and computer-executable instructions that are stored in the memory and can run on the processor. When the computer-executable instructions are executed by the processor, the processor performs the method in any one of the second aspect or the possible implementations of the second aspect, or any one of the fourth aspect or the possible implementations of the fourth aspect.

A ninth aspect of embodiments of this application provides a base station. The base station includes a centralized unit CU and a distributed unit DU. The CU is configured to perform the method in any one of the first aspect or the possible implementations of the first aspect, or any one of the third aspect or the possible implementations of the third aspect. The DU is configured to perform the method in any one of the second aspect or the possible implementations of the second aspect, or any one of the fourth aspect or the possible implementations of the fourth aspect.

A tenth aspect of embodiments of this application provides a computer-readable storage medium that stores one or more computer-executable instructions. When the computer-executable instructions are executed by a processor, the processor performs the method in any one of the first aspect or the possible implementations of the first aspect, or any one of the third aspect or the possible implementations of the third aspect.

An eleventh aspect of embodiments of this application provides a computer-readable storage medium that stores one or more computer-executable instructions. When the computer-executable instructions are executed by a processor, the processor performs the method in any one of the second aspect or the possible implementations of the second aspect, or any one of the fourth aspect or the possible implementations of the fourth aspect.

For technical effects brought by any one of the fifth aspect, the seventh aspect, the ninth aspect, and the tenth aspect or the possible implementations thereof, refer to the technical effects brought by the first aspect or the different possible implementations of the first aspect, and any one of the third aspect or the possible implementations of the third aspect. Details are not described herein again.

For technical effects brought by any one of the sixth aspect, the eighth aspect, the ninth aspect, and the eleventh aspect or the possible implementations thereof, refer to the technical effects brought by the second aspect or the different possible implementations of the second aspect, and any one of the fourth aspect or the possible implementations of the fourth aspect. Details are not described herein again.

In the technical solutions provided in embodiments of this application, the centralized unit CU receives the first message sent by the distributed unit DU, where the first message includes the first transport block size TBS threshold, and the first TBS threshold is used for early transmission of uplink data. The CU sends the first TBS threshold to the UE. The CU receives the uplink data sent by the UE based on the first TBS threshold. In this way, the CU obtains, from the first message sent by the DU, the first TBS threshold used for early transmission of uplink data, and sends the first TBS threshold to the UE, so that the UE sends the uplink data to the CU through early transmission of uplink data based on the first TBS threshold, thereby implementing early data transmission in the CU-DU separation scenario.

DESCRIPTION OF EMBODIMENTS

The following clearly describes the technical solutions in embodiments of this application with reference to the accompanying drawings in embodiments of this application.

Figure 3:
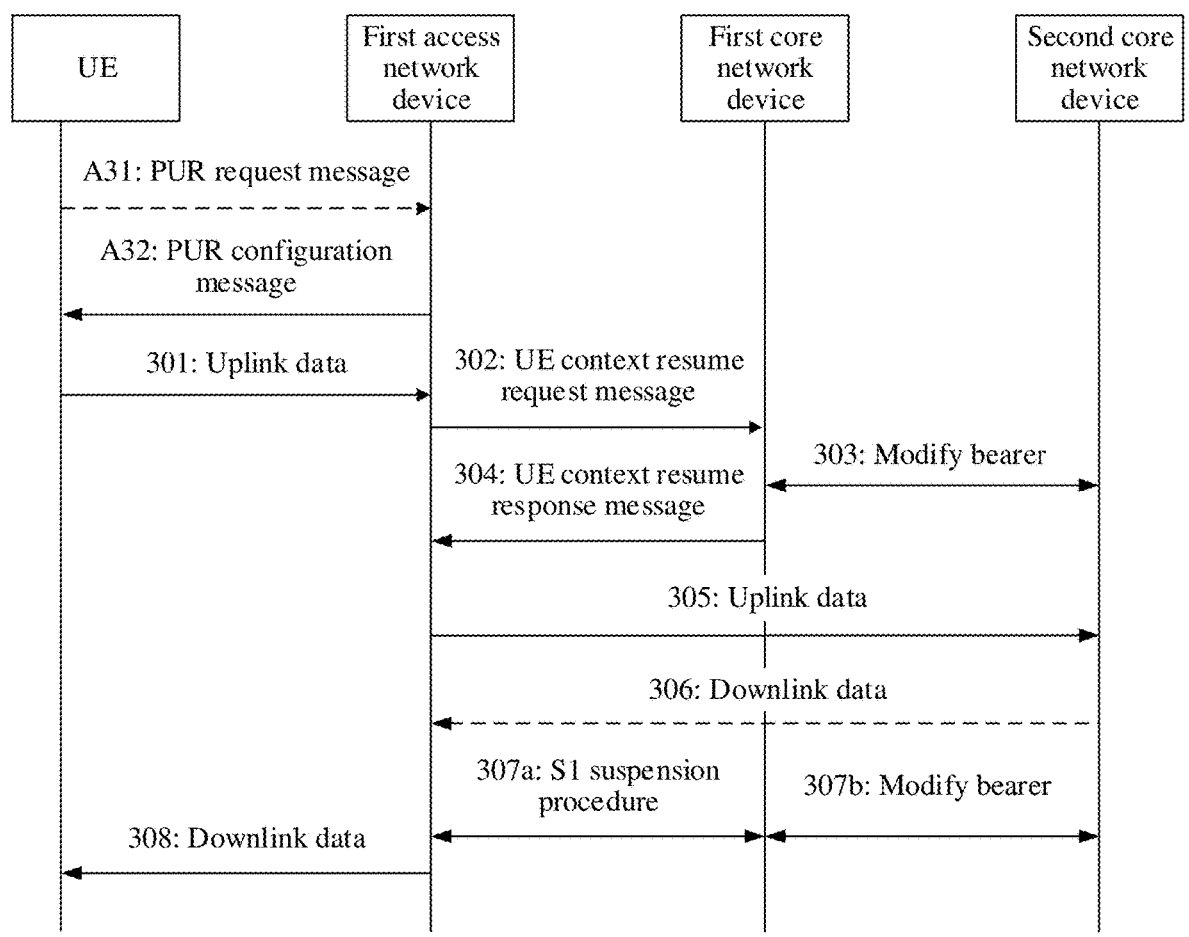
FIG. 3 is a schematic flowchart of another embodiment of an MO-EDT method used when a CU and a DU in a base station are not separated.
Figure 4:
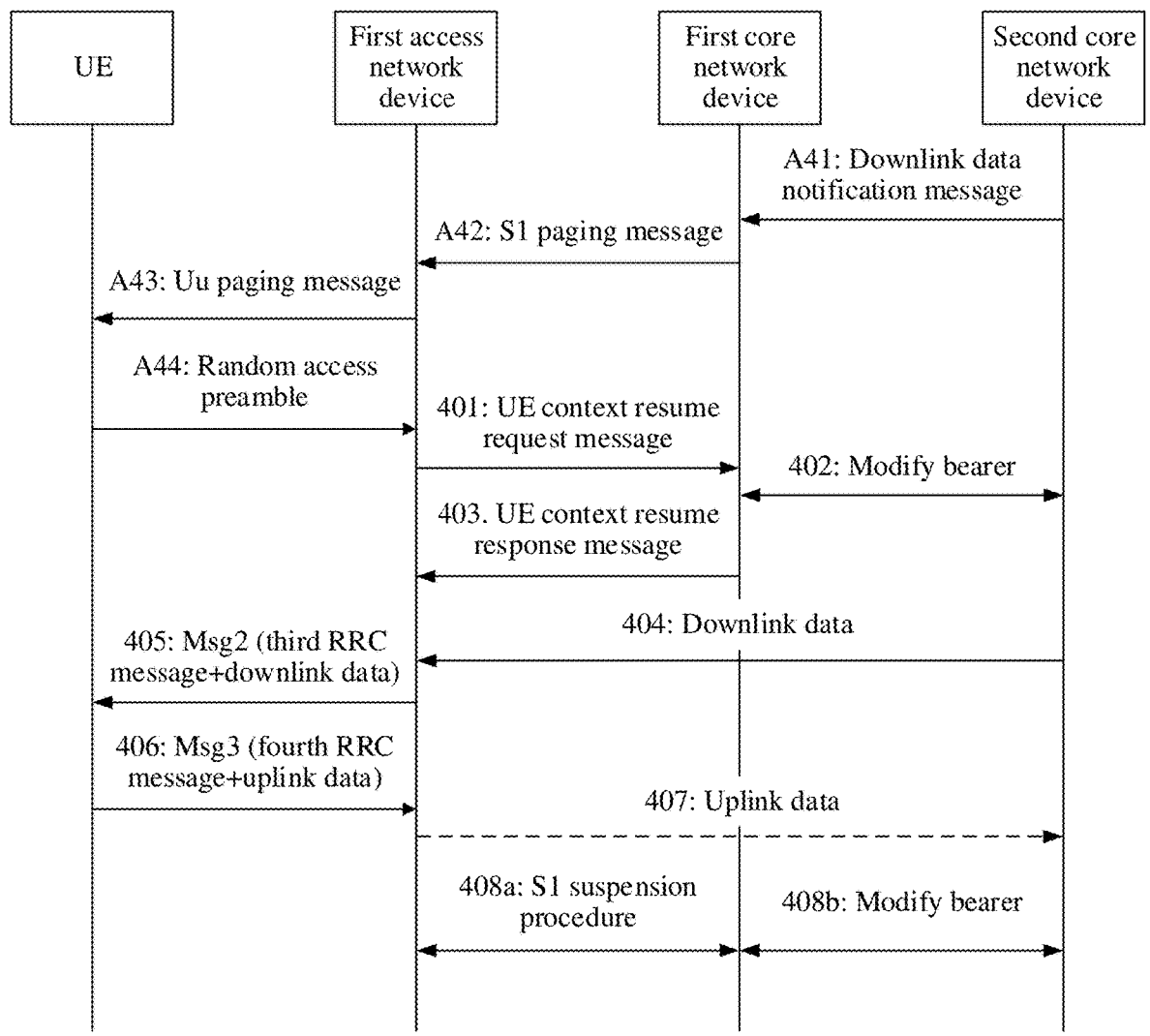
FIG. 4 is a schematic flowchart of another embodiment of an MO-EDT method used when a CU and a DU in a base station are not separated.
Figure 5:
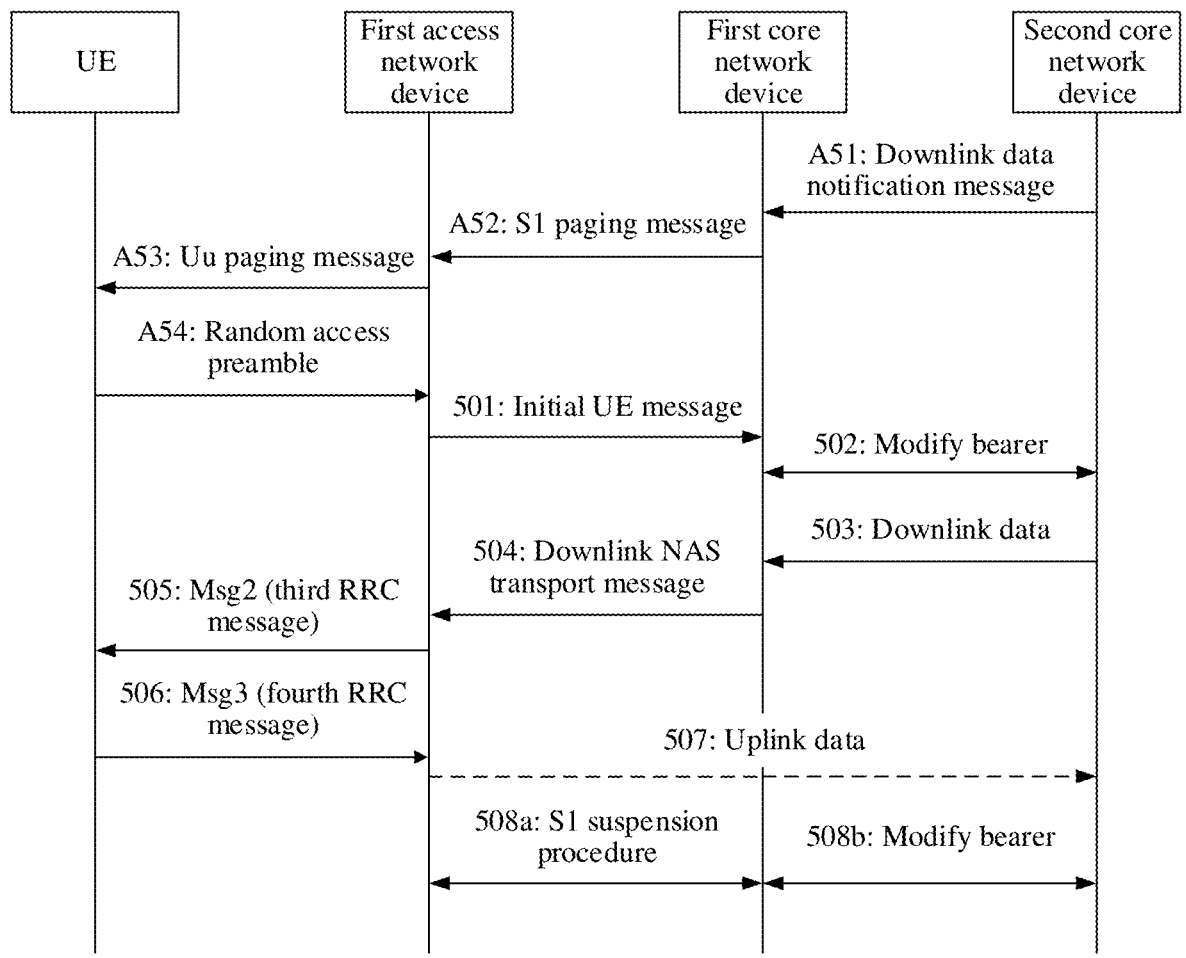
FIG. 5 is a schematic flowchart of another embodiment of a PUR method used when a CU and a DU in a base station are not separated.
Figure 6:
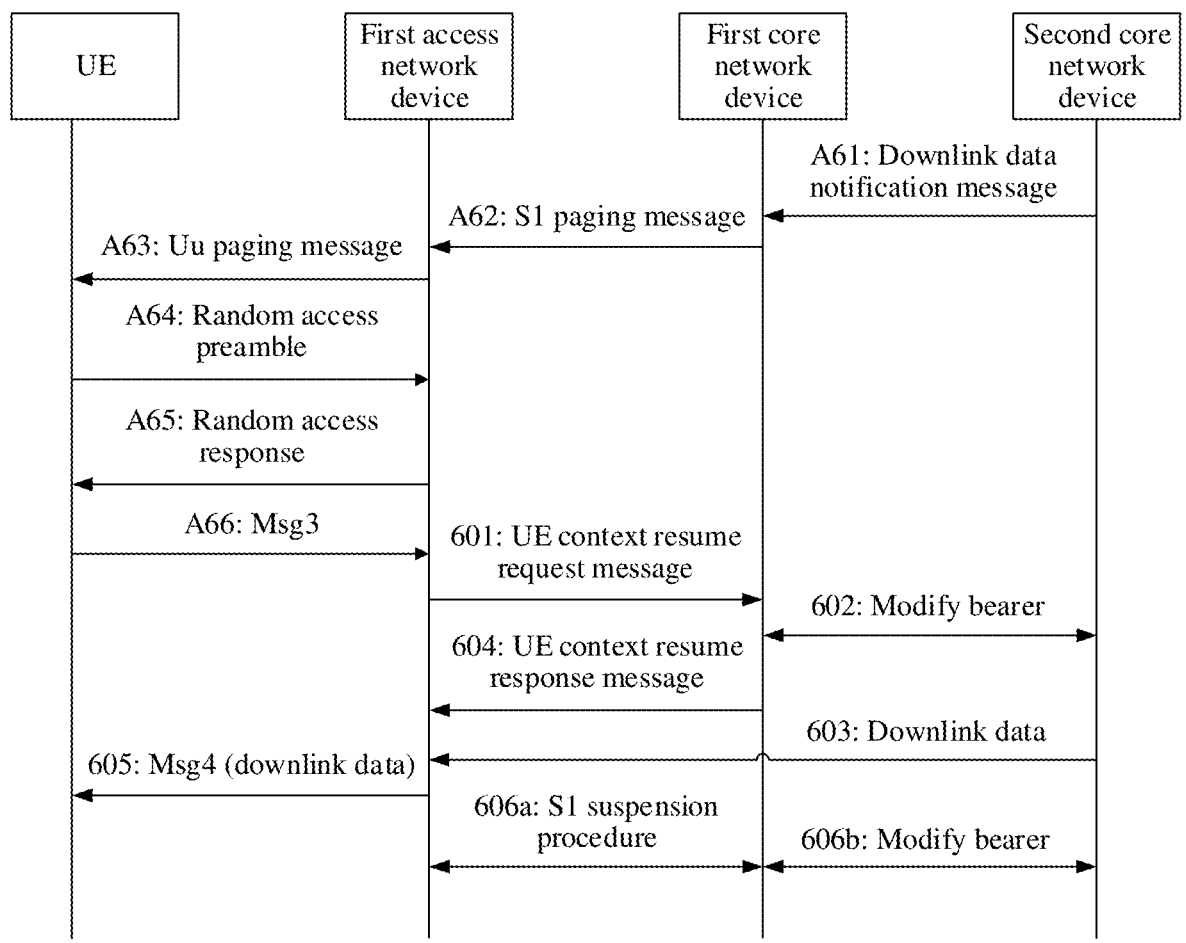
FIG. 6 is a schematic flowchart of another embodiment of an MT-EDT method used when a CU and a DU in a base station are not separated.
Figure 7:
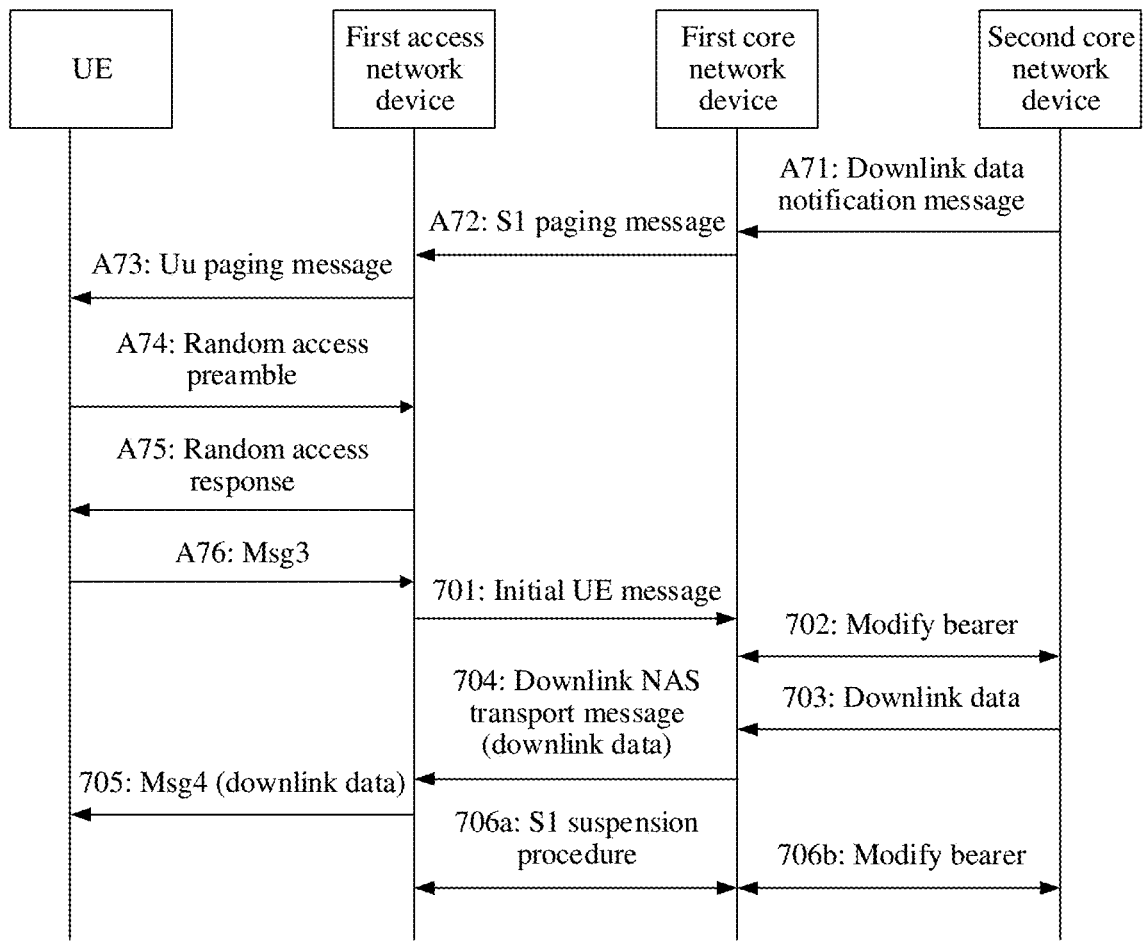
FIG. 7 is a schematic flowchart of another embodiment of an MT-EDT method used when a CU and a DU in a base station are not separated.

Refer to FIG. 1 to FIG. 7. FIG. 1 to FIG. 7 are specifically schematic flowcharts of an early data transmission method applied to a base station in a non-CU-DU separation architecture. The early data transmission method includes early transmission of uplink data MO-EDT, early transmission of downlink data MT-EDT, and data transmission based on a pre-configured uplink resource PUR. FIG. 1 to FIG. 4 are schematic flowcharts of an MO-EDT method, FIG. 5 is a schematic flowchart of a PUR method, and FIG. 6 and FIG. 7 are schematic flowcharts of an MT-EDT method.

Specifically, in embodiments of FIG. 1 to FIG. 7, UE, a first access network device, a first core network device, and a second core network device may interact with each other. The first access network device, the first core network device, and the second core network device may be different devices, to adapt to different communications systems. For example, the first core network device may be a mobility management entity (MME, mobility management entity), an access control and mobility management function (AMF, access control and mobility management function), or another device. The second core network may be a serving gateway (S-GW, serving gateway), a user plane function (UPF, user plane function), or another device. The first access network device may be an evolved NodeB (eNB, evolved NodeB), a next generation NodeB (gNB, next generation NodeB), a next generation-eNB (ng-eNB, next generation-evolved NodeB), or another device. Specifically, in the embodiments shown in the figures, descriptions are provided by using only an example in which the first access network device is an eNB, the first core network device is an MME, and the second core network device is an S-GW.

The eNB is a bridge between UE in LTE (4G) and an evolved packet core (Evolved Packet Core, EPC). The eNB is connected through an X2 interface. Main functions of the eNB include: radio resource management, IP header compression, user data stream encryption, MME selection during UE attachment, routing of user-plane data to an S-GW, organization and sending of a paging message, organization and sending of a broadcast message, measurement for mobility or scheduling purposes, measurement report configuration, and the like.

The gNB is a node that provides a new radio (new radio, NR) user plane and control plane protocol for UE, and may be connected to a 5G core network (5GC) through an NG interface.

The ng-eNB is a node that provides an E-UTRA user plane and control plane protocol for UE, and is connected to a 5GC through an NG interface.

Figure 1:
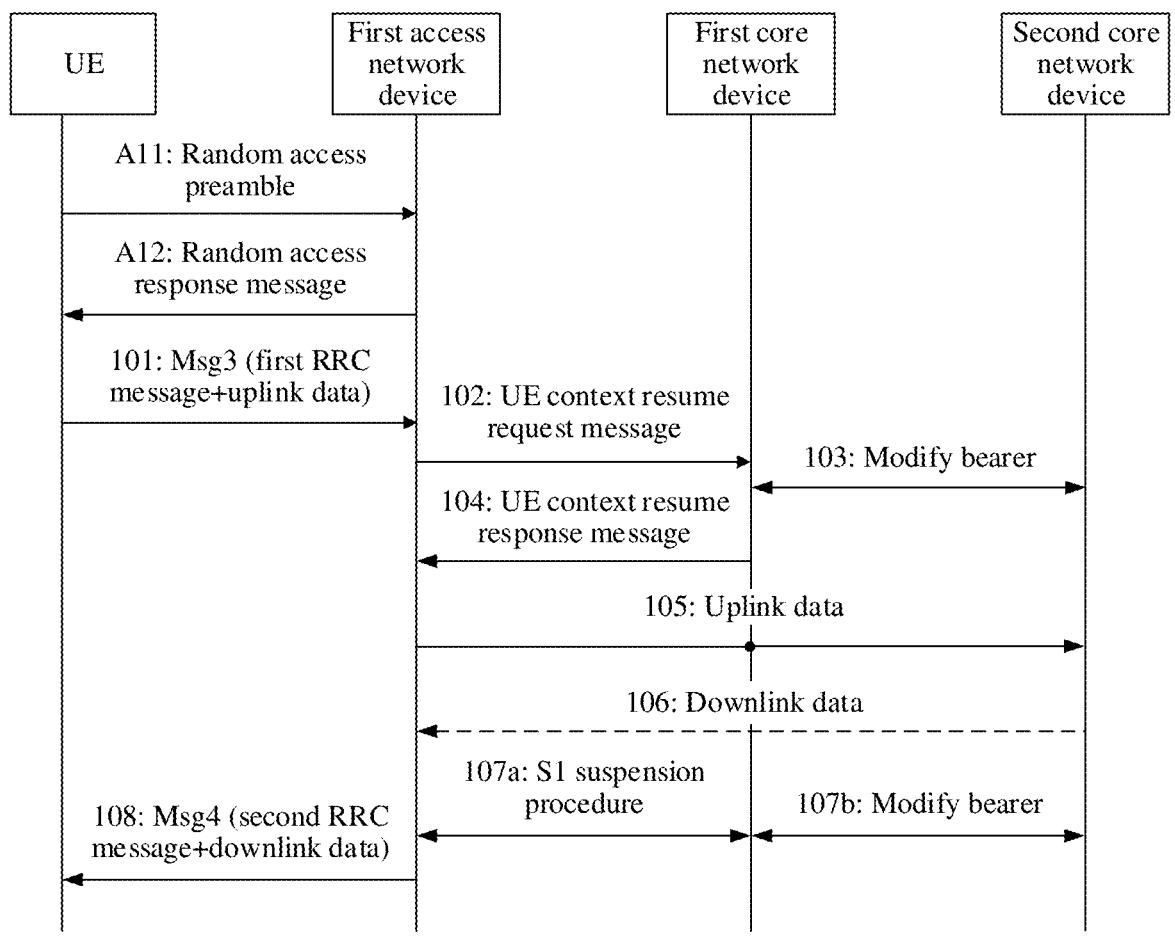
FIG. 1 is a schematic flowchart of an embodiment of an MO-EDT method used when a CU and a DU in a base station are not separated.

Refer to FIG. 1. FIG. 1 is a schematic flowchart of an implementation process of an UP solution in an MO-EDT. The UE may include uplink data in an Msg3 for sending, that is, send the eNB the uplink data together with an RRC connection resume request (RRC Connection Resume Request) message. A size of a MAC protocol data unit (PDU, protocol data unit) of the Msg3 is usually 56 bits. If the uplink data needs to be sent in the Msg3, more time-frequency resources need to be requested to send the uplink data. A resource for sending the Msg3 is indicated by an uplink scheduling grant (UL grant, uplink grant) in a random access response (Random access response, RAR) in step A12. The UE needs to indicate to the eNB in step A11 that the UE intends to send the uplink data in the Msg3, to obtain more resources in the RAR. The following describes steps in the flowchart in FIG. 1.

Step A11: The UE sends a random access preamble to the eNB.

Specifically, the UE may send the eNB the random access preamble preamble used for the MO-EDT. The preamble used for the MO-EDT may indicate that the UE is to send the uplink data in the Msg3. The preamble sent by the UE and a time-frequency resource used for sending the preamble herein may be broadcast by the eNB to the UE before step A11, so that the UE selects, based on a broadcast message, the preamble and/or the time-frequency resource that are/is used to indicate the uplink data and transmitted in advance.

Before step A11, the UE needs to receive, from the eNB, a TBS threshold used for early transmission of uplink data. Only when to-be-sent data in the UE is less than or equal to the TBS threshold, the UE can use the MO-EDT, that is, can send the eNB the preamble that indicates to send the data in the Msg3. The to-be-sent data may be a MAC PDU in which the uplink data is encapsulated.

Step A12: The eNB sends a random access response message to the UE.

Specifically, the eNB sends the UE the RAR message, that is, an MSG2, including the UL grant, a timing advance (TA, timing advance), and the like. The UL grant includes more resources. For example, the UL grant indicates that a MAC PDU of 1000 bits or less can be transmitted.

Step 101: The UE sends an Msg3 to the eNB, where the Msg3 includes a first RRC message and the uplink data.

Specifically, the UE sends the to-be-sent uplink data to the eNB in this step. In this step, when the UE determines that the UL grant in step A12 is received, and the TBS threshold indicated by the UL grant indicates that the to-be-sent uplink data can be accommodated in the UE, the UE sends the to-be-sent uplink data to the eNB. For example, the UE sends the Msg3 to the eNB. The Msg3 may include the to-be-sent uplink data, and the Msg3 may further include the first RRC message (for example, an RRC connection resume request (RRC connection resume request) message)) that is carried on a logical channel (for example, an SRB 0, a signaling radio bearer (SRB, signaling radio bearer) of a common control channel (CCCH, common control channel). The uplink data is carried on a dedicated traffic channel (DTCH, dedicated traffic channel) (for example, a data radio bearer (DRB, data radio bearer)). The data on the two channels is encapsulated by using a PDCP and RLC to form an RLC PDU, that is, a MAC service data unit (SDU, service data unit), and multiplexing is performed on a MAC layer to form a MAC PDU.

In addition, the to-be-sent uplink data is encrypted by using a key. The key is deduced from next hop chaining count (NCC, next hop chaining count), and the NCC may be carried in an RRC connection release (RRC Connection Release) message previously sent by the eNB to the UE.

Step 102: The eNB sends a UE context resume request (UE context resume request) message to the MME.

Step 103: The MME interacts a modify bearer (modify bearer) message with the S-GW.

Step 104: The MME sends a UE context resume response (UE context resume response) message to the eNB.

Step 105: The eNB sends the uplink data to the S-GW.

Specifically, after determining that the UE context resume response message sent by the MME is received, the eNB may send the uplink data to the S-GW.

Step 106: The S-GW sends downlink data to the eNB.

Specifically, if the S-GW determines that there is the downlink data that needs to be sent to the UE, the S-GW may send the downlink data to the eNB after step 105, namely, in subsequent step 106.

Steps 107a and 107b: The eNB and the MME release an S1 connection of the UE, and the MME interacts the modify bearer (modify bearer) message with the S-GW.

After sending the uplink data to the S-GW, if the eNB does not receive the downlink data or a data volume of the downlink data is small, the eNB requests to suspend UE context.

Step 108: The eNB sends an Msg4 to the UE.

Specifically, the eNB sends the Msg4 to the UE. The Msg4 may include a second RRC message, for example, an RRC connection release (RRC Connection Release) message, the message is carried on a DCCH (Dedicated Control Channel, dedicated control channel) (SRB 1), and the message carries data such as a release cause release cause, a resume ID resume ID, and NCC. If there is the downlink data, the Msg4 may further include the downlink data. The downlink data is carried on a DTCH and multiplexed with an RRC connection release message.

In the procedure, the UE is always in an idle IDLE mode and does not enter a connected mode. After a data packet is transmitted between the UE and the eNB, the UE is released immediately.

Figure 2:
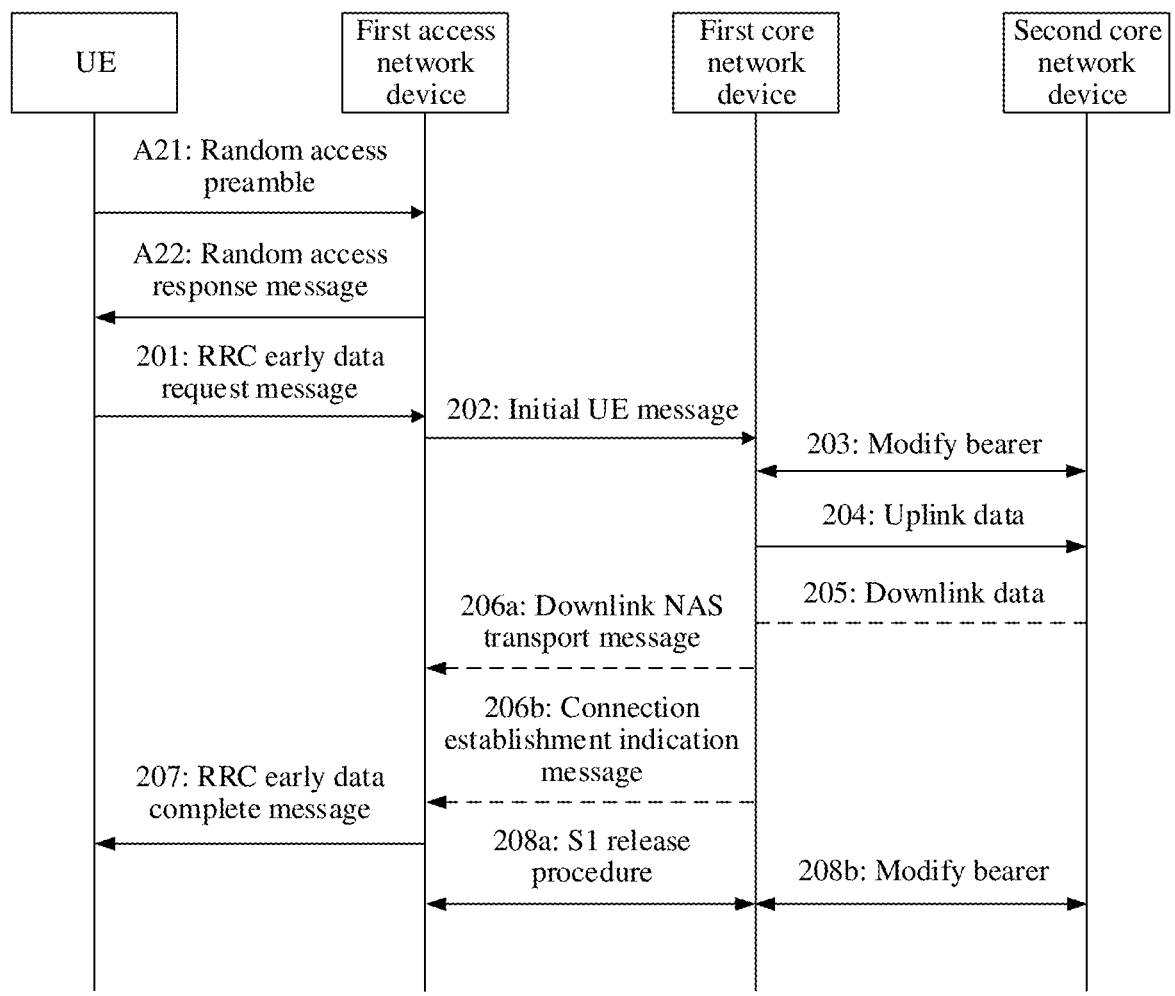
FIG. 2 is a schematic flowchart of another embodiment of an MO-EDT method used when a CU and a DU in a base station are not separated.

Refer to FIG. 2. FIG. 2 is a schematic flowchart of another implementation process of MO-EDT, that is, a CP solution corresponding to the MO-EDT method in FIG. 1.

Steps A21 and A22 are similar to the implementation process in the UP solution. Details are not described herein again.

Step 201: The UE sends an RRC early data transmission request message to the eNB.

Specifically, the UE sends the RRC early data transmission request (RRC early data transmission request) message to the eNB. The message carries an S-temporary mobile subscriber identity (S-TMSI, SAE-temporary mobile subscriber identity) used to identify the UE, an establishment cause used to indicate a cause for initiating the request, and a dedicated Info NAS used to carry uplink data. The uplink data is encapsulated in a form of an NAS message at a non-access stratum (NAS, non-access stratum) layer, and is an NAS message at an access stratum (AS, access stratum) layer. Security protection is not used at the AS layer, but security at the NAS layer can be used. In other words, there may be no information such as NCC and an AS security key in the CP solution.

Step 202: The eNB sends an initial UE message to the MME.

Specifically, the eNB sends the MME the initial UE message (Initial UE message) that carries an NAS message including the uplink data.

Step 203: The MME interacts a modify bearer (modify bearer) message with the S-GW.

Step 204: The MME sends the uplink data to the S-GW.

Step 205: The S-GW sends downlink data to the MME.

Specifically, if the S-GW has the downlink data for the UE, the S-GW sends the downlink data to the MME.

Step 206: The MME sends a message to the eNB.

Specifically, if the MME receives the downlink data for the UE sent by the S-GW, the MME sends a downlink NAS transport (DL NAS transport) message including the downlink data to the eNB, namely, step 206a.

If the MME does not receive the downlink data for the UE, the MME sends a connection establishment indication (connection establishment indication) message to the eNB, namely, step 206*b*.

Step 207: The eNB sends an RRC early data complete message to the UE.

Specifically, if the eNB does not receive the downlink data for the UE, or a data volume of the downlink data for the UE received by the eNB is small, the eNB sends the UE the RRC data early transmission complete (RRC Early Data Complete) message that may carry the downlink data.

Step 208*a* and step 208*b*: The eNB and the MME release an S1 connection of the UE, and the MME interacts the modify bearer (modify bearer) message with the S-GW.

The UE is also in an IDLE mode in the CP solution in FIG. 2.

Refer to FIG. 3. FIG. 3 is a schematic flowchart of an implementation process of a PUR solution. Compared with the MO-EDT, an uplink data transmission method based on the PUR omits a step in which the UE sends a preamble to the eNB and a step in which the UE receives an RAR. In addition, a PUR resource needs to be configured in advance, to send uplink data in step 1.

Step A31: The UE sends a PUR request message to the eNB.

Specifically, this step is optional, that is, may not be performed in an actual running process of the solution. The UE sends a pre-configured uplink resource request (PUR Request) message to the eNB to request for a PUR resource.

The message may carry characteristic information of service data in the UE and/or capability information of the UE, for example, a period in which the UE sends the uplink data, a data volume of the uplink data, and a maximum TBS supported by the UE.

Step A32: The eNB sends a PUR configuration message to the UE.

In this step, the eNB may first determine whether the PUR resource can be configured for the UE, and send the PUR configuration message to the UE if the PUR resource can be configured for the UE.

The configuration message may include a period of the PUR resource, a quantity of physical resource blocks (PRB, physical resource block), a TBS, a TA, and the like.

The configuration message may be carried in an RRC connection release message, an RRC early data complete message, or another downlink message.

Then, the UE stores PUR configuration information in the PUR configuration message, and enters an idle mode.

Step 301: The UE sends the uplink data to the eNB.

In this step, when the UE needs to send the uplink data, the UE may first determine whether the uplink data can be sent based on the PUR resource. If the uplink data can be sent based on the PUR resource, the UE sends the uplink data to the eNB based on the PUR resource. Along with sending of the uplink data, the UE may further send the eNB a first RRC message, for example, a PUR transmission request (PUR Transmission Request) message. The message may carry at least one of a resume ID, shortResumeMAC-I, a PUR resource release indication, an uplink data indication, a downlink data indication, a buffer status report, and a data volume indication. The PUR resource release indication is used by the UE to request the eNB to release the PUR resource. The uplink data indication is used to indicate that the UE still has uplink data to be sent. The downlink data indication is used to indicate that the UE will have downlink data to arrive. The buffer status report or the data volume indication is used to indicate a data volume of the uplink data buffered in the UE. The data volume may be a size of a MAC PDU obtained after the buffered uplink data is encapsulated.

Steps 302 to 308 are similar to the technical processes of step 102 to step 108 in the MO-EDT in FIG. 1 and step 202 to step 208 in the MO-EDT in FIG. 2. Details are not described herein again.

Refer to FIG. 4. FIG. 4 is a schematic flowchart of an implementation process of an MO-EDT, that is, an UP solution in which an MSG2 is used. Downlink data is carried in the Msg2 for sending, that is, the UE receives the downlink data after sending a random access preamble. Before sending the downlink data to the UE, the eNB needs to determine whether the downlink data can be sent to the UE through one downlink transmission (for example, one downlink message or one transport block TB). If a data volume of the downlink data is large, the eNB cannot send the downlink data to the UE through one downlink transmission. In this case, the eNB needs to trigger an RRC connection establishment procedure, so that the UE enters an RRC connected mode, and sends the data in the connected mode.

The eNB needs to determine whether the UE is in a service range of the eNB, so as to send the downlink data in the Msg2 in step 405. Therefore, the eNB sends a paging message to the UE, where the paging message carries a dedicated random access resource that can be used by the UE. When the UE receives the paging message, the UE sends the preamble to the eNB by using the random access resource included in the paging message. When receiving the preamble sent by using the dedicated random access, the eNB can determine that the UE having to-be-sent uplink data is within the service range of the eNB, and then sends the downlink data to the UE. Detailed steps are as follows:

Step A41: The S-GW sends a downlink data notification message to the MME.

Specifically, the S-GW sends the downlink data notification (downlink data notification) message to the MME. The message may carry an evolved packet system bearer identity (EPS Bearer ID, evolved packet system bearer identity), the EPS bearer ID is associated with the UE, and the message is used to indicate the MME that the UE associated with the EPS Bearer ID has the downlink data to arrive.

The message may further carry the data volume of the downlink data (DL data size), to implement transmission of a small downlink data packet.

Step A42: The MME sends an S1 paging message to the eNB.

Specifically, the MME sends a paging message (which may be referred to as the S1 paging message) to the eNB in a tracking area (Tracking Area, TA) with which the UE registers, where the paging message carries a NAS ID (for example, an S-TMSI) of the paged UE, the DL data size, and a resume ID, and the resume ID is used by the eNB to obtain UE context (UE Context).

Step A43: The eNB sends a Uu paging message to the UE.

Specifically, the eNB sends a paging message (which may be referred to as the Uu paging message) to the UE if the eNB receives the S1 paging message from the MME, where the paging message carries the NAS ID (for example, an S-TMSI) of the UE. In addition, the paging message may further indicate a cell radio network temporary identifier (C-RNTI, cell radio network temporary identifier) and a random access channel (an RACH resource, random access channel). The C-RNTI is used to process, for example, scramble, data when the UE sends the uplink data, or is used by the UE to listen to a PDCCH, where the PDCCH is used to schedule the UE to perform downlink or uplink data transmission. The RACH resource includes an RACH time-frequency resource, for example, carrier information, resource block (Resource Block, RB) information, time information, and a preamble. The paging message may further include coverage enhancement level (Coverage enhancement Level, CEL) information. For example, when performing data transmission, the UE needs to repeatedly send uplink data or repeatedly receive downlink data in eMTC and NB-IoT technologies. Therefore, repetition quantities of different levels are defined. For example, a coverage enhancement level 0 includes repetition quantities {1, 2, 4, 8}, a coverage enhancement level 1 includes repetition quantities {16, 32, 64}, and a coverage enhancement level 2 includes repetition quantities {128, 256, 512}. A coverage range of a signal can be improved through repeat transmission.

Step A44: The UE sends a random access preamble to the eNB.

In this step, if the UE receives the Uu paging message, and the Uu paging message includes the S-TMSI of the UE, and if the paging message includes the RACH resource and the C-RNTI that are allocated to the UE, the UE sends the preamble to the eNB by using the RACH resource included in the paging message.

Step 401: The eNB sends a UE context resume request message to the MME.

If the eNB receives the preamble sent by using the RACH resource included in the Uu paging message, the eNB may determine that the UE is within the service range of the eNB. Then, the eNB sends the UE context resume request message to the MME, to indicate the MME that the UE needs to access a network.

The UE context resume request message carries an MME UE S1AP ID and an eNB UE S1AP ID. The MME UE S1AP ID is used to uniquely identify UE associated with an S1 interface in the MME, and the eNB UE S1AP ID is used to uniquely identify UE associated with an S1 interface in the eNB.

In this step, after determining the UE, the eNB may determine the resume ID of the UE, and resume the context information of the UE based on the resume ID.

Step 402: The MME interacts a modify bearer message with the S-GW.

Specifically, after receiving the UE context resume request message, the MME sends a modify bearer request modify bearer request message to the S-GW to request to modify a bearer corresponding to the UE, and then the S-GW sends a modify bearer response modify bearer response message to the MME. In addition, this step is optional.

Step 403: The MME sends the eNB a UE context resume response message sent by the UE.

Specifically, after receiving the modify bearer response, the MME sends the UE context resume response message to the eNB, to indicate the eNB that the context information and bearer information related to the UE have been resumed.

Step 404: The S-GW sends the downlink data to the eNB.

Specifically, the S-GW may send the downlink data for the UE to the eNB after step 402.

Step 405: The eNB sends the UE the Msg2 carrying a third RRC message and the downlink data.

In this step, after receiving, from the S-GW, the downlink data for the UE, the eNB sends the UE the Msg2 carrying the downlink data. The Msg2 may further include the third RRC message, for example, an RRC early data transmission (RRC Early Data-MT) message.

Step 406: The UE sends an Msg3 to the eNB, where the Msg3 may include a fourth RRC message.

Specifically, if the UE needs to send the uplink data, the Msg3 may further include the uplink data.

In this step, after receiving the downlink data and the fourth RRC message, the UE sends the Msg3 to the eNB, where the Msg3 includes the third RRC message, for example, an RRC early data transmission confirm RRC early data-MT confirm message, which is used to indicate the eNB that the UE has received the downlink data successfully.

In addition, if there is the uplink data, the uplink data together with the third RRC message may be sent to the eNB in step 406.

Then, the UE enters an idle mode.

Step 407: The eNB sends the uplink data to the S-GW.

Specifically, if the eNB receives the uplink data sent by the UE, the eNB sends the uplink data to the S-GW.

Step 408a and step 408b: The eNB requests the MME to suspend the UE, and the MME interacts a modify bearer message with the S-GW.

Suspension indicates that the UE, the eNB, and the MME store the context information of the UE, but the UE enters the idle mode and no longer performs data transmission. If data transmission needs to be performed, RRC connection resume, that is, the process of step 401 to step 403 needs to be performed.

Refer to FIG. 5. FIG. 5 is a schematic flowchart of another implementation process of an MT-EDT, namely, a CP solution in which an MSG2 is used. Steps A51 to A54 are similar to steps A41 to A44 in FIG. 4. Details are not described herein again.

Step 501: The eNB sends an initial UE message (Initial UE message) to the MME.

In this step, if the eNB receives a preamble on an RACH resource included in a UU paging message, the eNB may determine that the UE is within a service range of the eNB. Then, the eNB sends the initial UE message message to the MME, so as to send an initial layer 3 message to the MME.

The message includes an eNB UE S1AP ID and an NAS PDU (namely, the initial layer 3 message). The NAS PDU includes security information between the UE and the MME.

Step 502 is similar to step 402 in FIG. 4. Details are not described herein again.

Step 503: The S-GW sends downlink data to the MME.

Step 504: The MME sends a downlink NAS transport message (DL NAS TRANSPORT) to the eNB.

Specifically, the MME sends the eNB the downlink NAS transport message carrying the downlink data.

Step 505: The eNB sends the Msg2 to the UE.

Specifically, the eNB sends the Msg2 to the UE, where the Msg2 includes a third RRC message, and the third RRC message includes the downlink data.

Step 506: The UE sends an Msg3 to the eNB.

Specifically, the UE sends the Msg3 to the eNB, where the Msg3 includes a fourth RRC message, and the fourth RRC message may include uplink data.

Step 507: The eNB sends the uplink data to the S-GW.

Specifically, if the eNB receives the uplink data sent by the UE, the eNB sends the uplink data to the S-GW by using the MME.

In a possible implementation, step 507 and step 508 may be performed at the same time, that is, the uplink data may be carried in a message in step 508a.

Step 508*a* and step 508*b*: The eNB requests the MME to suspend the UE, and the MME interacts a modify bearer message with the S-GW.

Specifically, release indicates that the UE, the eNB, and the MME no longer store context information of the UE, and the UE enters an idle mode and no longer performs data transmission. If data transmission needs to be performed, an RRC connection establishment procedure needs to be performed.

Related steps in the solutions of early transmission of downlink data by using an MSG4 in FIG. 6 and FIG. 7 are similar to the technical process in early transmission of downlink data by using the MSG4 in the method for early transmission of uplink data in FIG. 1 and FIG. 2. Details are not described herein again.

The solutions in FIG. 1 to FIG. 7 are applied to early data transmission in the base station in the non-CU-DU separation architecture (namely, a centralized base station architecture), and have the following disadvantages when being applied to a base station in a CU-DU separation architecture:

In the embodiments corresponding to FIG. 1 and FIG. 2, in the centralized base station architecture, an RRC layer and a MAC layer are located in a same entity/unit, and the RRC layer can easily obtain resource configuration information. However, in the CU-DU architecture, because the RRC layer and the MAC layer are located in different entities, the RRC layer cannot accurately obtain the resource configuration information. Specifically, for example, when generating a TBS threshold included in RRC signaling, a CU needs to obtain the resource configuration information, where the resource configuration information is generated by a DU. For another example, in step 108 in FIG. 1, step 308 in FIG. 3, and step 207 in FIG. 2, a CU needs to learn whether the downlink data can be sent to the UE in step 207 or step 108/308. If a data volume of the downlink data is large, the CU needs to trigger an RRC connection establishment process, so as to transmit data with large volume. Because the resource configuration information is located in a DU, the CU cannot learn a relationship between the resource configuration information and the data volume of the downlink data. For example, the CU cannot learn whether the downlink data can be transmitted by using an available resource, and therefore cannot learn whether the RRC connection establishment process needs to be triggered.

In the embodiment corresponding to FIG. 3, the PUR configuration information is generated at an RRC layer. However, because the PUR configuration information is resource configuration information, and is provided by a MAC layer in a DU, the RRC layer located in a CU cannot obtain the resource configuration information through internal interaction. This affects data transmission based on the PUR.

In the embodiments corresponding to FIG. 4 to FIG. 7, in the method for sending the downlink data by using the Msg2, when the eNB receives the data volume of the downlink data sent by the MME, the eNB needs to determine whether the downlink data can be sent to the UE by using the message Msg2. If the eNB determines that the downlink data can be sent to the UE by using the message Msg2, the eNB allocates an RACH resource, a C-RNTI, and the like to the UE, and sends the downlink data to the UE by using the paging message. If the eNB determines that the downlink data cannot be sent to the UE by using the message Msg2, the eNB sends a normal paging message to the UE, that is, the normal paging message does not carry an RACH resource, a C-RNTI, and the like. In the centralized base station architecture, the eNB can determine the resource configuration information to determine whether the RACH resource, the C-RNTI, and the like need to be carried in the paging message at the RRC layer. In addition, the RACH resource carried in the paging message also comes from the MAC layer. Therefore, the eNB can obtain the RACH resource and C-RNTI information from the MAC layer, to perform encapsulation at the RRC layer. However, in a distributed base station architecture, namely, in the CU-DU architecture, there is no resource configuration information when the CU determines whether the downlink data can be sent by using the Msg2. The resource configuration information is located in the DU. As a result, whether the downlink data can be sent by using the Msg2 cannot be learned, and this affects use of the method for sending the downlink data by using the Msg2. There is also the problem in the method for sending the downlink data by using the Msg4.

This application provides a data transmission method, a centralized unit, and a distributed unit, to resolve the foregoing problems and implement early data transmission in a CU-DU separation scenario. The following separately describes this application by using schematic diagrams in FIG. 8 to FIG. 19.

Figure 8:
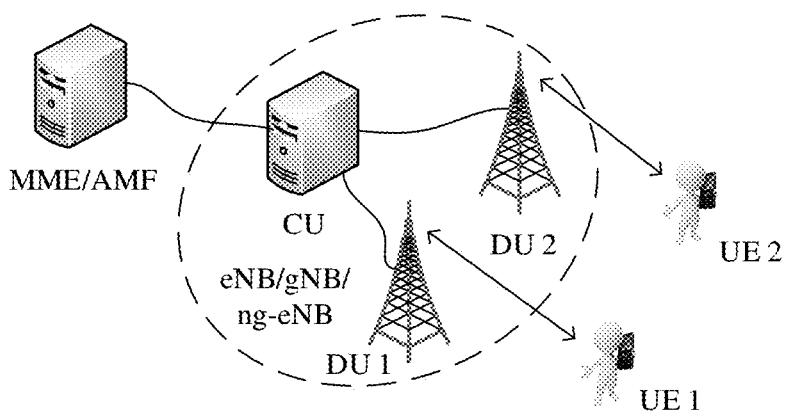
FIG. 8 is a schematic diagram of an application scenario of an embodiment of a data transmission method according to an embodiment of this application.

Refer to FIG. 8. An embodiment of this application is applied to LTE, 5G, or a future communications system, and may be a scenario shown in FIG. 8. Specifically, user equipment (User Equipment, UE) includes a mobile phone, an intelligent terminal, a multimedia device, a streaming media device, and the like. A base station device may be an evolved NodeB (Evolved NodeB, eNB) in an LTE system, or may be a gNB in a 5G system, or may be an ng-eNB.

The eNB is a bridge between UE in LTE (4G) and an evolved packet core (Evolved Packet Core, EPC). The eNB is connected through an X2 interface. Main functions of the eNB include: radio resource management, IP header compression, user data stream encryption, MME selection during UE attachment, routing of user-plane data to an S-GW, organization and sending of a paging message, organization and sending of a broadcast message, measurement for mobility or scheduling purposes, measurement report configuration, and the like.

The gNB is a node that provides a new radio (new radio, NR) user plane and control plane protocol for UE, and may be connected to a 5G core network (5GC) through an NG interface.

The ng-eNB is a node that provides an E-UTRA user plane and control plane protocol for UE, and is connected to a 5GC through an NG interface.

The eNB, the gNB, and the ng-eNB may include a CU and a DU in a CU-DU separation architecture. The CU is a logical node, is responsible for RRC, SDAP, and PDCP protocols of the gNB or responsible for RRC and a PDCP of the ng-eNB and the eNB, and controls one or more DUs. The DU is a logical node, is responsible for RLC, MAC, and PHY layers of the gNB, the ng-eNB, and the eNB, and is controlled by the CU. One DU supports one or more cells.

A core network device may be an MME or an AMF. The MME is a key control node in an LTE access network, and is responsible for location of UE (User Equipment) in an idle mode, a paging process, bearer establishment, and a release process, and the like. The AMF mainly includes functions such as access control plane termination, non-access stratum termination, non-access stratum encryption and integrity protection, registration management, connection management, reachability management, mobility management, lawful interception, and access authentication.

Figure 9:
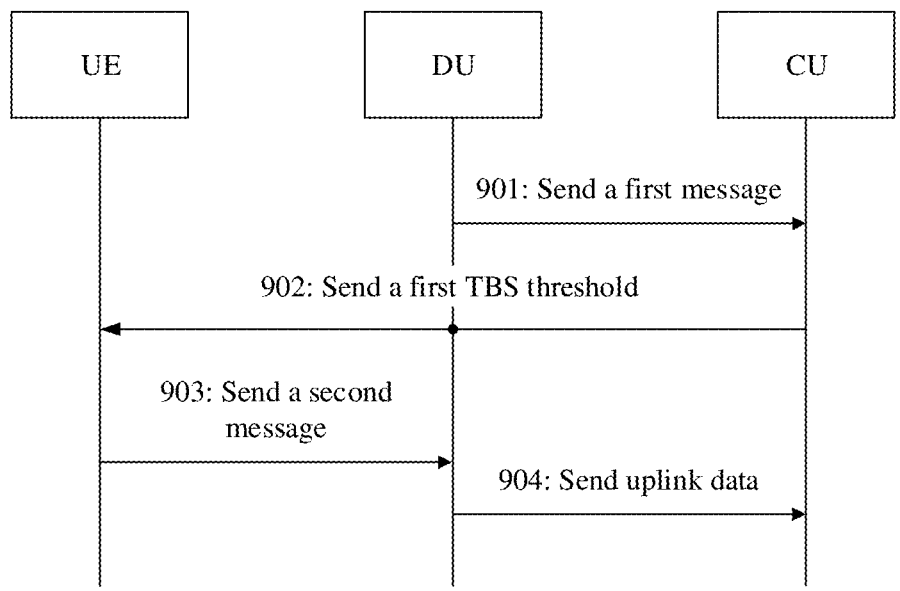
FIG. 9 is a schematic flowchart of an embodiment of a data transmission method according to an embodiment of this application.

Refer to FIG. 9. FIG. 9 is a schematic flowchart of an embodiment of an early data transmission method according to an embodiment of this application. The method includes the following steps.

Step 901: A DU sends a first message to a CU.

In this step, in a network architecture in which a centralized unit CU and a distributed unit DU are separated, the DU determines a first transport block size TBS threshold that needs to be used when user equipment UE performs early transmission of uplink data. The CU receives the first message sent by the DU, where the first message may include the first TBS threshold.

In a possible implementation, before step 901, the DU may be triggered, based on indication information sent by the CU, to send the first message to the CU. For example, the CU may first send first capability information indicating supporting MO-EDT to the DU, and the DU sends the first message to the CU when the DU receives the first capability information. The first message may further include a capability indication message, for example, the capability indication message indicates that the DU supports early transmission of uplink data, such as capability information indicating supporting MO-EDT, or capability information indicating supporting a PUR.

In addition, in this step, the first message includes the first TBS threshold. Specifically, the first TBS threshold may be a specific threshold, or may be a data set of available thresholds. When the first TBS threshold indicates the data set, if a data volume in the UE is less than a TBS (denoted as the first TBS) indicated by a UL grant, the UE may select a TBS (denoted as a second TBS) that is less than the first TBS and greater than or equal to the data volume in the UE, and then the UE sends the uplink data based on the second TBS. This can reduce a quantity of bits for zero adding and improve resource utilization efficiency. For example, if the TBS (the first TBS) indicated by the UL grant is 800 bits, the data volume in the UE is 500 bits, and available TBSs are {300, 400, 500, 600, 700, 800}, the UE selects the TBS 500 bits. Because the TBS is selected by the UE, and the DU does not know the TBS selected by the UE, the DU needs to blindly detect, based on the possible TBSs {300, 400, 500, 600, 700, 800}, the uplink data sent by the UE, that is, the DU needs to perform blind detection for a maximum of six times to detect the uplink data. Compared with a method in which TBS selection is not enabled, this method increases complexity for the DU. A TBS threshold subset may further be added based on the data set, to reduce complexity for the DU. To be specific, a subset, for example, {300, 500, 700} is established on the basis of {300, 400, 500, 600, 700, 800}. The UE selects a TBS from the subset to send the uplink data. This can reduce complexity for the DU.

Step 902: The CU sends the first TBS threshold to the UE.

In this step, the CU sends the UE the first TBS threshold obtained in step 901. Specifically, the CU may send the first TBS threshold to all UEs within a service range, or may send the first TBS threshold to specified UE. This is not limited herein.

Step 903: The UE sends a second message to the DU.

In this step, the UE may determine, based on the first TBS threshold, whether early transmission of uplink data can be used. When the UE determines, based on the first TBS threshold, that early transmission of uplink data can be used, the UE sends the uplink data to the DU through early transmission of uplink data.

Step 904: The DU sends the uplink data to the CU.

In this step, the DU sends the CU the uplink data obtained in step 903.

Specifically, the DU sends the uplink data to the CU in a plurality of manners. For example, the DU may send the uplink data to the CU by using a CP solution, or sends the uplink data to the CU by using an UP solution.

In this embodiment, the centralized unit CU receives the first message sent by the distributed unit DU, where the first message includes the first transport block size TBS threshold, and the first TBS threshold is used for early transmission of uplink data. The CU sends the first TBS threshold to the UE. The CU receives the uplink data sent by the UE based on the first TBS threshold. In this way, the CU obtains, from the first message sent by the DU, the first TBS threshold used for early transmission of uplink data, and sends the first TBS threshold to the UE, so that the UE sends the uplink data to the CU through early transmission of uplink data based on the first TBS threshold, thereby implementing early data transmission in a CU-DU separation scenario.

It should be noted that, a process in which the UE sends the uplink data to the CU through early transmission of uplink data may be a process in which the UE sends the uplink data to the CU through MO-EDT, or may be a process in which the UE sends the uplink data to the CU based on a PUR.

In this embodiment, the step of early transmission of uplink data is completed when the DU sends the uplink data to the CU in step 904. In this solution, if there is downlink data for the UE in the CU, the CU may send the downlink data through early transmission of downlink data after step 904. In a process in which the CU determines whether to send the UE the downlink data through early transmission of downlink data, the CU may perform determining, or the DU may perform determining and then send a determining result to the CU. It can be learned from the foregoing that a determining basis is a TBS threshold set by the DU. The following separately describes the two cases.

1. A Process in which the CU Performs Determining

In this embodiment, in the process in which the CU performs determining, a second TBS threshold used for early transmission of downlink data needs to be obtained. The DU may send the second TBS threshold in a process in which the DU sends the uplink data to the CU in step 904, or the DU may send the second TBS threshold to the CU in advance by using a cell-level limitation information. The limitation information is cell-level information, rather than for individual UEs. Further, the cell-level limitation information may further be included in a configuration update message. The DU may alternatively send the second TBS threshold to the CU in another manner. This is not limited herein.

When the DU sends the uplink data to the CU by using the CP solution, step 904 may be specifically that the DU sends first initial uplink RRC message transfer to the CU, where the first initial uplink RRC message transfer may include the uplink data and the second TBS threshold. The CU may compare a data volume of the downlink data with the second TBS threshold. When the CU determines that the downlink data can be transmitted through early transmission of downlink data, the CU may send the DU an RRC complete message carrying the downlink data, so that the DU sends the downlink data to the UE after obtaining the downlink data. Otherwise, the CU sends an RRC fallback/RRC establishment message to the DU, so that the DU establishes UE context to transmit the downlink data.

When the DU sends the uplink data to the CU by using the UP solution, the DU may send second initial uplink RRC message transfer to the CU before step 904, where the second initial uplink RRC message transfer may include the second TBS threshold and/or an indication message, and the indication message is used to indicate to establish UE context, so as to perform step 904 of sending the uplink data to the CU. In this case, when the second initial uplink RRC message transfer includes the second TBS threshold, the CU may further compare a data volume of the downlink data with the second TBS threshold. When the CU determines that the downlink data can be transmitted through early transmission of downlink data, the CU may send the DU an RRC release message, an early transmission of downlink data indication, and the downlink data, so that the DU can send the downlink data to the UE through early data transmission. Otherwise, the CU sends the DU an RRC resume message or an RRC setting message, so that the DU establishes the UE context to transmit the downlink data.

2. A Process in which the DU Performs Determining

In this embodiment, the DU has a preset second TBS threshold used for early transmission of downlink data. Therefore, in the process in which the DU performs determining, the DU needs to obtain information about the downlink data. The information about the downlink data may be a data volume of the downlink data or the downlink data.

When the CU sends the downlink data to the DU by using the CP solution, after step 904, the CU sends the DU an RRC complete message carrying the downlink data, and indication information used to indicate that the RRC complete message is used for early transmission of downlink data. In this way, the DU can determine, based on the preset second TBS threshold, whether the downlink data is sent through early transmission of downlink data. If the downlink data is sent through early transmission of downlink data, the DU sends the UE, the RRC complete message carrying the downlink data, so that the UE obtains the downlink data. If the downlink data is not sent through early transmission of downlink data, the DU initiates the CU into establishment of UE context to transmit the downlink data.

When the CU sends the information about the downlink data to the DU by using the CP solution, after step 904, the CU sends the DU an RRC release message, the downlink data, and indication information used to indicate that the downlink data is transmitted through early transmission of downlink data. In this way, the DU can determine, based on the preset second TBS threshold, whether the downlink data is sent through early transmission of downlink data. If the downlink data is sent through early transmission of downlink data, the DU sends the UE the downlink data, so that the UE obtains the downlink data. If the downlink data is not sent through early transmission of downlink data, the DU initiates the CU into establishment of UE context to transmit the downlink data.

In embodiments of this application, specifically, the process in which the UE sends the uplink data to the CU by using the DU in the embodiment in FIG. 9 may be an MO-EDT process, or may be a process in which the UE sends the uplink data based on a PUR. The following describes the two cases by using specific embodiments.

1. Perform Early Data Transmission by Using an MO-EDT Method

Specifically, in a process of performing early data transmission by using the MO-EDT method, if an MME indicates the CU that there is downlink data for the UE, the CU may send the downlink data to the UE after receiving the uplink data sent by the UE. This saves signaling overheads for establishing an RRC connection for the UE. In addition, because the DU is responsible for resource scheduling, the DU determines whether downlink data transmission can be completed through one transmission. In this case, the CU or the DU can determine whether the downlink data can be transmitted in an MSG4 through the MO-EDT early data transmission. If the MO-EDT early data transmission cannot be used, the CU triggers fallback to an RRC connection resume or setup procedure. The following separately describes the two cases in detail by using specific embodiments.

(1) The CU determines whether to perform fallback.

Figure 10:
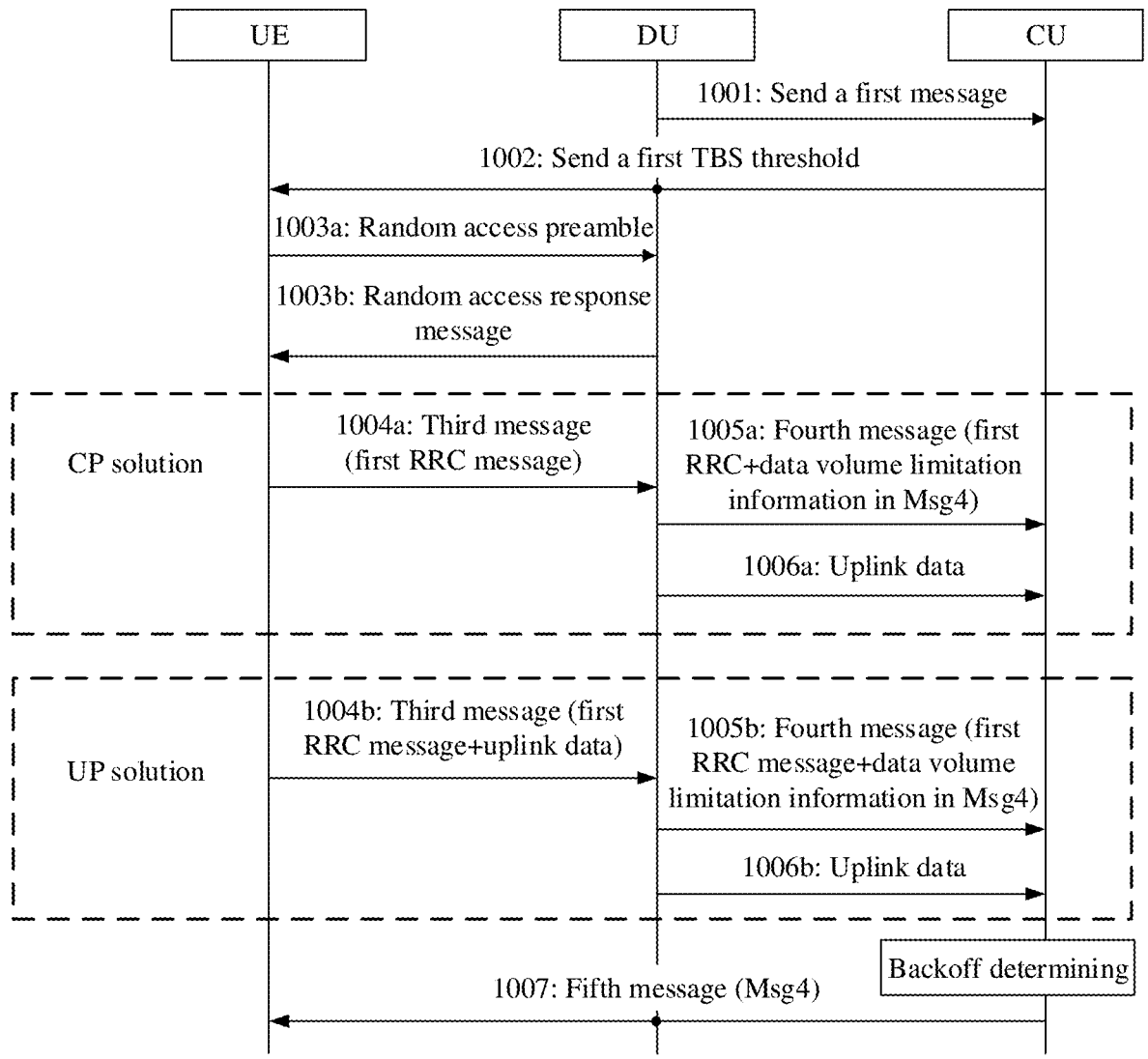
FIG. 10 is a schematic flowchart of another embodiment of a data transmission method according to an embodiment of this application.
Figure 11:
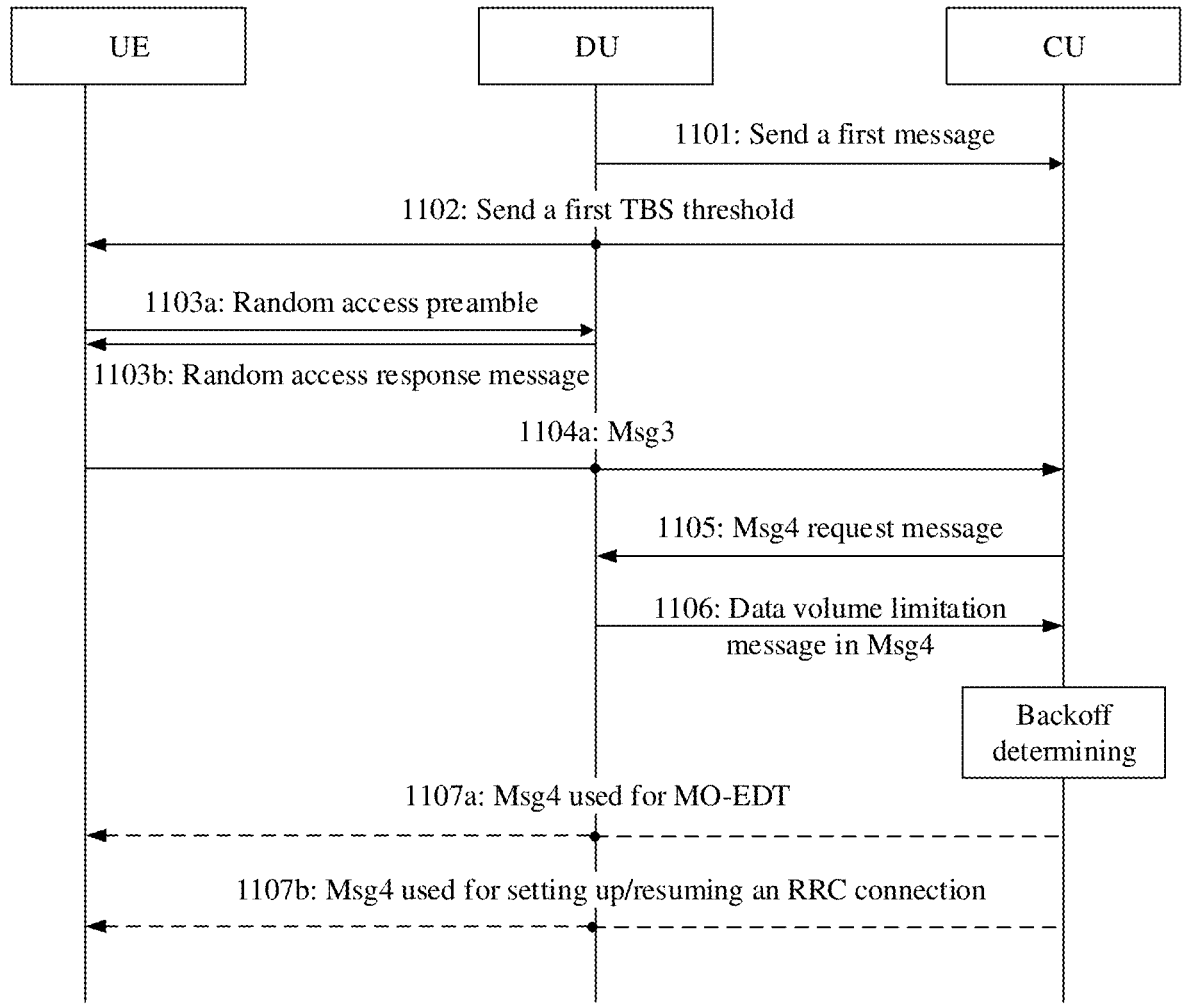
FIG. 11 is a schematic flowchart of another embodiment of a data transmission method according to an embodiment of this application.

Refer to FIG. 10 and FIG. 11 separately. FIG. 10 and FIG. 11 each are a schematic flowchart of another embodiment of a data transmission method according to an embodiment of this application. The method includes the following steps.

Specifically, refer to FIG. 10. Step 1001: A DU sends a first message to a CU.

Specifically, the DU sends the first message to the CU, where the first message carries a first TBS threshold used for MO-EDT.

In a possible implementation, the CU sends first capability information to the DU, where the first capability information is used to indicate that the CU supports MO-EDT. When the DU receives the first capability information, the DU sends the first TBS threshold to the CU.

In a possible implementation, the DU sends second capability information to the CU, where the second capability information is used to indicate that the DU supports MO-EDT.

In a possible implementation, the DU sends first indication information to the CU, where the first indication information is used to indicate that the DU supports TBS selection.

The TBS selection indicates that when UE sends uplink data by using an MO-EDT method, the UE needs to first determine whether the uplink data to be sent by the UE is less than or equal to the first TBS threshold sent by the DU. If the uplink data to be sent by the UE is less than or equal to the first TBS threshold, the UE may send the uplink data by using the MO-EDT method. The uplink data to-be-sent by the UE may be far less than the first TBS threshold. For example, the first TBS threshold is 1000 bits, but the data to-be-sent by the UE is 500 bits. If a UL grant allocated by the DU to the UE in an RAR indicates the TBS 1000 bits, the UE needs to add zeros of 500 bits to fill the 1000 bits, so as to reach 1000 bits. As a result, half of the resources are not used to transmit useful information in the UE, zero adding is performed, and resource utilization efficiency is reduced. MO-EDT supports a method for the UE to select a TBS, that is, when the CU enables the TBS selection, if a data volume in the UE is less than the TBS (denoted as the first TBS) indicated in the UL grant, the UE may select a TBS (denoted as a second TBS) that is less than the first TBS and greater than or equal to the data volume in the UE. Then, the UE sends the uplink data based on the second TBS. This can reduce a quantity of bits for zero adding and improve resource utilization efficiency.

In a possible implementation, the DU may send second indication information to the CU, where the second indication information is used to indicate that the DU supports a TBS subset.

On the basis of the TBS selection method, for example, if the first TBS threshold is 1000 bits, the TBS (the first TBS) indicated in the UL grant is 800 bits, the data volume in the UE is 500 bits, and available TBSs are {300, 400, 500, 600, 700, 800}, the UE selects the TBS 500 bits. Because the TBS is selected by the UE, and the DU does not know the TBS selected by the UE, the DU needs to blindly detect, based on the possible TBSs {300, 400, 500, 600, 700, 800}, the uplink data sent by the UE, that is, the DU needs to perform blind detection for a maximum of six times to detect the uplink data. Compared with a method in which TBS selection is not enabled, this method increases complexity for the DU. A method for enabling the TBS subset can be used, to reduce complexity for the DU. To be specific, a subset, for example, {300, 500, 700} is established on the basis of {300, 400, 500, 600, 700, 800}. The UE selects a TBS from the subset to send the uplink data. This can reduce complexity for the DU.

In a possible implementation, the second capability information, the first indication information, and the second indication information may be included in the first message.

In a possible implementation, the first message may be an F1 setup request (F1 SETUP REQUEST) message or a DU configuration update (DU CONFIGURATION UPDATE) message.

In a possible implementation, the first capability information may be included in a reset (RESET) message.

Step 1002: The CU sends the first TBS threshold to the UE.

Specifically, the CU sends a second message to the UE by using the DU based on the first message, where the second message includes the first TBS threshold used for MO-EDT.

In a possible implementation, the second message may further include the first indication information and/or the second indication information.

In a possible implementation, the first TBS threshold is equal to or less than a maximum TBS in the Msg3.

In a possible implementation, the second message may be a system information block 1 (system information block 1, SIB1).

Step 1003a: The UE sends a preamble to the DU.
Step 1003b: The DU sends an RAR to the UE.
Step 1004a and step 1004b: The UE sends a third message Msg3 to the DU.

In a CP solution, the UE sends the Msg3 to the DU, where the Msg3 carries a CCCH SDU, and the CCCH SDU carries a first RRC message, for example, an RRC early data request message. A MAC layer in the DU determines that a MAC SDU is the CCCH SDU. Further, the DU may determine, based on a size (size) of the CCCH SDU, that the CCCH SDU is a CCCH SDU used for MO-EDT, that is, the CCCH SDU carries the uplink data; and then performs step 1005a. If determining that the CCCH SDU is not a CCCH SDU used for MO-EDT, the DU does not perform step 1005a. For example, determining may be performed based on the size of the CCCH SDU. The CCCH SDU not used for MO-EDT is usually 48 bits, and the CCCH SDU used for MO-EDT is usually greater than 48 bits.

In an UP solution, the Msg3 includes a CCCH SDU and a DTCH SDU. The CCCH SDU carries a first RRC message, for example, an RRC connection resume request message or an RRC resume request message, and the DTCH SDU carries the uplink data. When the DU determines that there is the DTCH SDU, and the DU determines that the Msg3 is used for MO-EDT, the DU performs step 1005b and step 1006b. If there is no DTCH SDU, the DU does not perform step 1005b and step 1006b.

Step 1005a and step 1005b: The DU sends a fourth message to the CU, where the fourth message includes the first RRC message and data volume limitation information in the Msg4.

In a possible implementation, the data volume limitation information in the Msg4 may be a maximum data volume in the Msg4 that is allowed to be scheduled, may be a maximum TBS in the Msg4 that is allowed to be scheduled, or may be the second TBS threshold in the Msg4.

In a possible implementation, the data volume limitation information in the Msg4 may be sent to the CU before the DU receives the Msg3. In this case, the data volume limitation information may be used for all UEs that initiate MO-EDT, that is, the data volume limitation information is cell-level information, rather than for individual UEs.

In a possible implementation, the cell-level data volume limitation information may be included in a configuration update message.

In a possible implementation, the fourth message may be an initial uplink RRC message transfer (Initial UL RRC Message Transfer) message.

In a possible implementation, the fourth message may further include a first indication, for example, an MO-EDT indication, and the first indication is used to indicate the UE to transmit the data by using a method for early transmission of uplink data.

Step 1006a and step 1006b: The DU sends the uplink data to the CU.

In the CP solution, namely, in step 1006a, the uplink data is encapsulated in the NAS PDU, and the NAS PDU is included in the first RRC message. The CU receives the fourth message, extracts the NAS PDU, and sends the NAS PDU to a core network device (for example, an MME or an AMF). A connection may be established for the UE by using the core network device.

In the UP solution, namely, in step 1006b, the uplink data is encapsulated in the DTCH SDU. The DU receives the third message, and sends the first RRC message to the CU. The CU resumes UE context based on the first RRC message. Then, the CU configures the UE context for the DU. The DU parses the DTCH SDU based on the UE context to generate the PDCP PDU, and sends the PDCP PDU to the CU.

Step 1007: The CU sends a fifth message (namely, an Msg5) to the UE by using the DU.

In the CP solution and the UP solution, the CU may receive downlink data from the core network device, and the CU determines, based on a data volume of the downlink data and the data volume limitation information in the received Msg4, whether to send the Msg4 to the UE by using MO-EDT, that is, determines whether the downlink data can be sent to the UE through one transmission (or one TB).

Specifically, in the UP solution in MO-EDT, the Msg3 includes the RRC connection resume request message and the uplink data. The DU encapsulates, in the INITIAL UL RRC MESSAGE TRANSFER, the RRC connection resume request message encapsulated in the CCCH SDU, to send to the CU. If the DU determines that the process is MO-EDT, the INITIAL UL RRC MESSAGE TRANSFER further includes the indication information that indicates MO-EDT and/or the data volume limitation information in the Msg4. After receiving the INITIAL UL RRC MESSAGE TRANSFER message, the CU resumes the UE context information based on the RRC connection resume request message and sends the UE CONTEXT SETUP REQUEST message to the DU. The DU establishes the UE context based on the message, parses the uplink data included in Msg3, and sends the uplink data to the CU. If there is the downlink data arriving at the CU, the CU determines, based on the data volume of the downlink data and the data volume limitation information in the Msg4, a message to be sent in the Msg4. For example, if the data volume of the downlink data is less than or equal to a data volume allowed in the Msg4 indicated in the data volume limitation information in the Msg4, the CU determines to send an RRC connection release message in the Msg4, sends the downlink data to the DU by using an UP-PDCP, and sends the RRC connection release message by using the CP-PDCP. After receiving the downlink data and the RRC connection release message, the DU multiplexes the downlink data and the RRC connection release message into one MAC PDU, and sends the MAC PDU to the UE by using a PHY. If the data volume of the downlink data is greater than the data volume allowed in the Msg4, the CU determines to send an RRC connection resume message in the Msg4 and resumes an RRC connection to send the downlink data.

In the CP solution in MO-EDT, the Msg3 includes the RRC early data request message, where the RRC early data request message includes the NAS PDU, and the NAS PDU includes the uplink data. The DU determines, based on the Msg3 or the size of the CCCH SDU, that the UE sends the uplink data by using the MO-EDT method. Then, the DU encapsulates the RRC early data request message in the INITIAL UL RRC MESSAGE TRANSFER, to send to the CU. The message may further carry the indication information that indicates MO-EDT and/or the data volume limitation information in the Msg4. After receiving the message, the CU performs a UE context establishment process with the MME. If there is the downlink data arriving at the CU, the CU determines, based on the data volume of the downlink data and the data volume allowed in the Msg4, a message to be sent in the Msg4. For example, if the data volume of the downlink data is less than or equal to the data volume allowed in the Msg4, the CU determines to send an RRC early data complete message in the Msg4. If the data volume of the downlink data is greater than the data volume allowed in the Msg4, the CU determines to send an RRC connection setup message in the Msg4 and send the downlink data by establishing an RRC connection.

In the foregoing process, when the RRC connection setup message or the RRC connection resume message is sent in the Msg4, the process is referred to as fallback, that is, a process of falling back to a process of resuming or establishing the RRC connection.

In this embodiment, the CU interacts with the DU the data volume allowed in the Msg4, so that the CU can determine the message to-be-sent in the Msg4. This improves availability of the MO-EDT method.

Specifically, in the embodiment of this application in FIG. 11, differences from the embodiment corresponding to FIG. 10 lie in the following steps.

Step 1105: The CU sends the DU a data volume limitation request message in an Msg4.

Specifically, the CU sends the DU the data volume limitation request message in the Msg4, to request for data volume limitation information in the Msg4.

Step 1106 is the same as step 1004*b* in the embodiment corresponding to FIG. 10.

The CU determines, based on the received data volume limitation information in the Msg4, whether to send an Msg4 used for MO-EDT or an Msg4 used for setting up/resuming an RRC connection.

Step 1107*a*: When the CU determines, in step 1106, that the received data volume limitation information in the Msg4 is not less than a data volume of downlink data, the CU sends the DU the Msg4 used for MO-EDT.

Step 1107*b*: When the CU determines, in step 1106, that the received data volume limitation information in the Msg4 is less than a data volume of downlink data, the CU sends the DU the Msg4 used for setting up/resuming the RRC connection.

In this solution, the CU determines whether to perform fallback by using the Msg4.

In this embodiment, the CU requests, from the DU, the data volume limitation information in the Msg4. This can prevent the CU from blindly sending the DU the data volume limitation information in the Msg4, and reduces signaling overheads between DU-CU.

(2) The DU determines whether to perform fallback.

Figure 12:
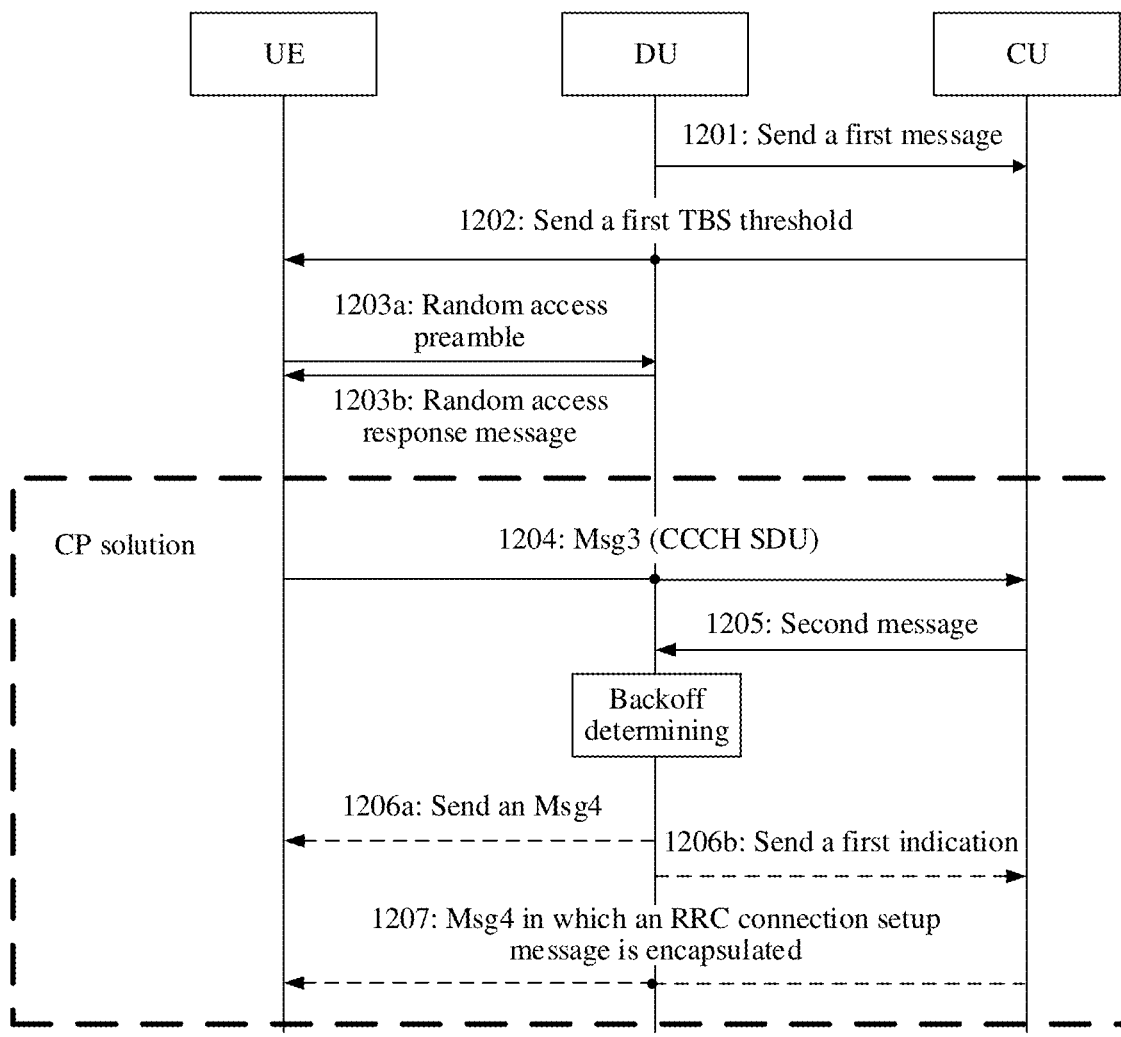
FIG. 12 is a schematic flowchart of another embodiment of a data transmission method according to an embodiment of this application.
Figure 13:
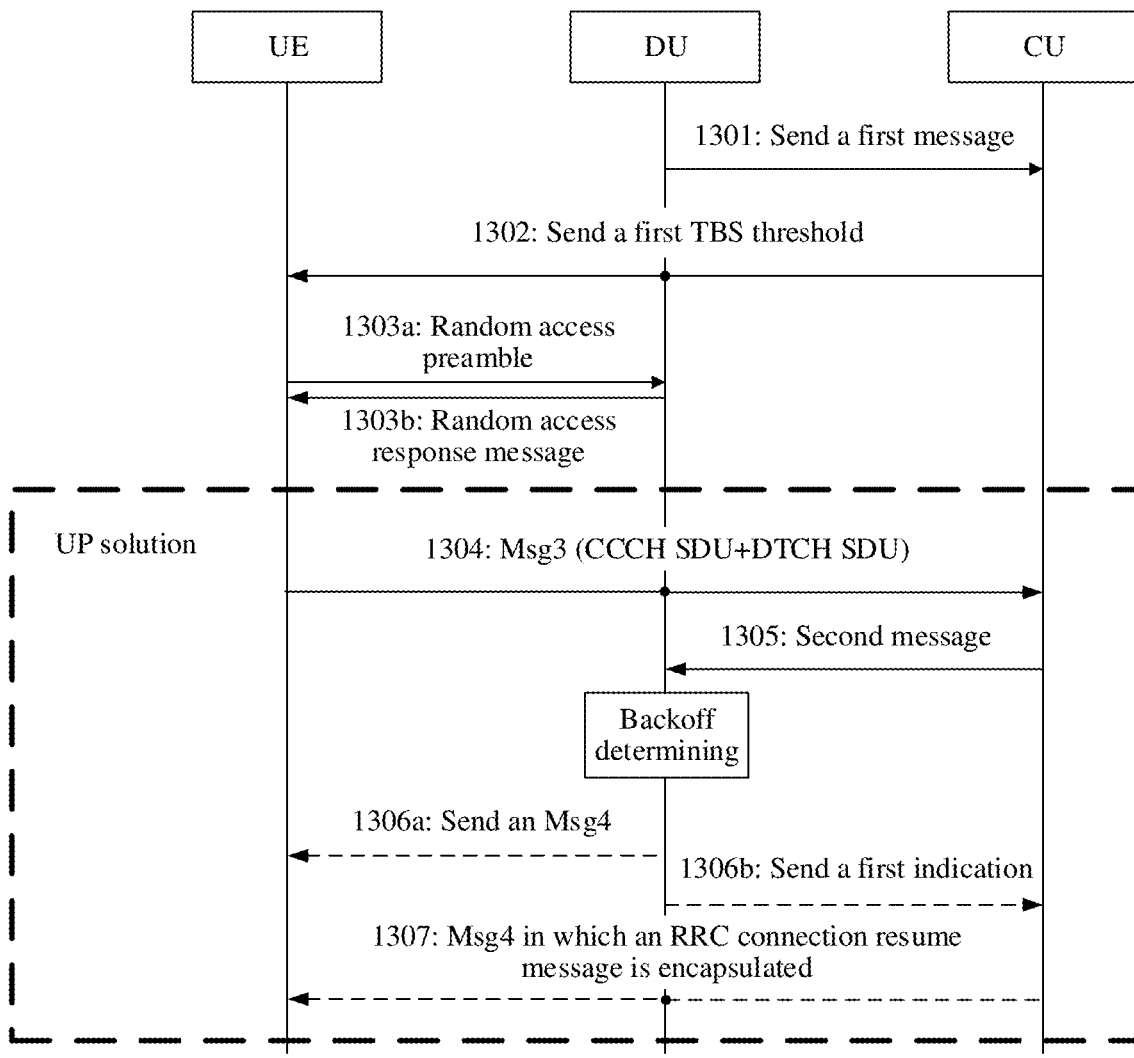
FIG. 13 is a schematic flowchart of another embodiment of a data transmission method according to an embodiment of this application.
Figure 14:
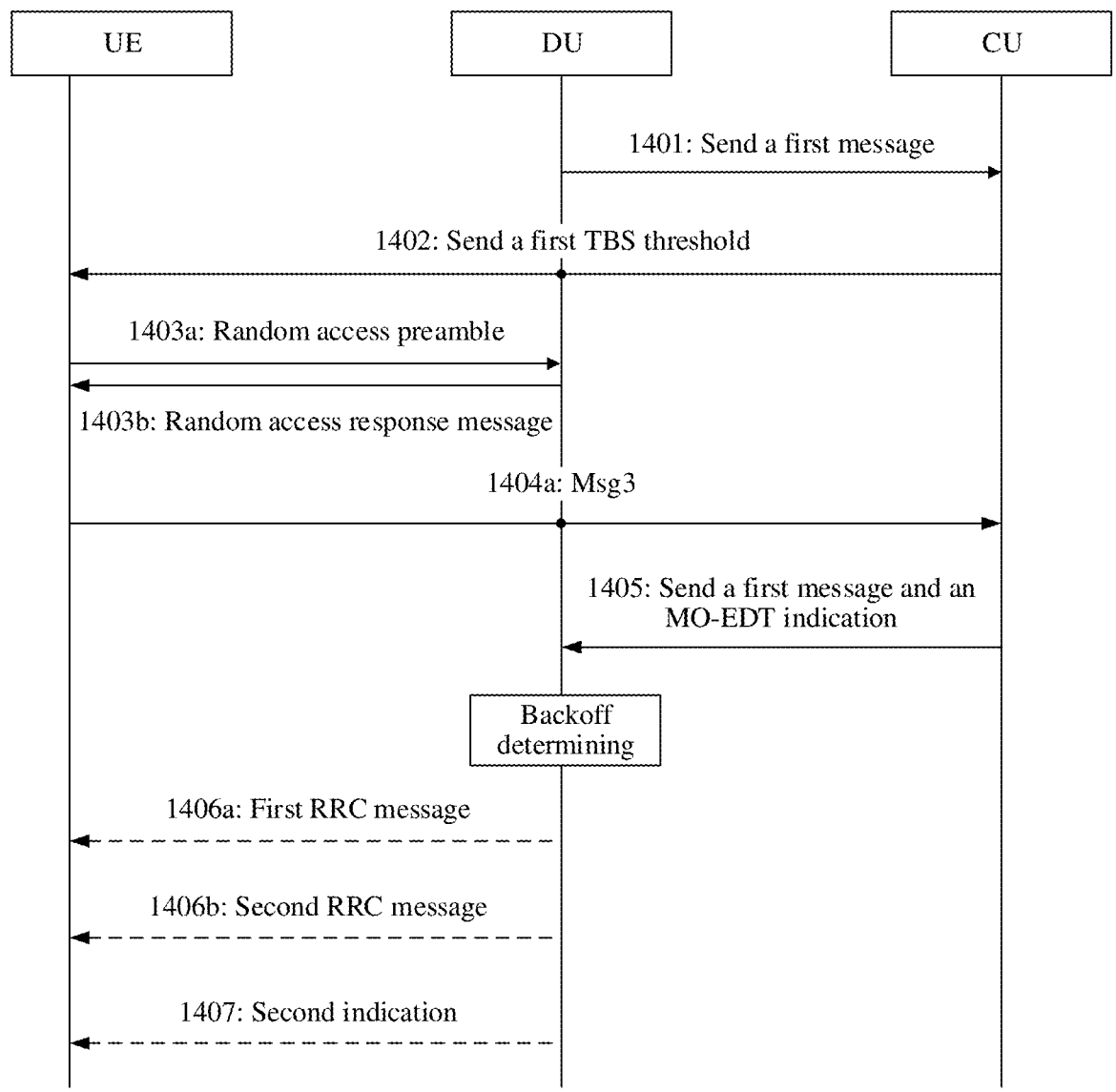
FIG. 14 is a schematic flowchart of another embodiment of a data transmission method according to an embodiment of this application.

Refer to FIG. 12 to FIG. 14 separately. FIG. 12 to FIG. 14 each are a schematic flowchart of another embodiment of a data transmission method according to an embodiment of this application. The DU determines whether to perform fallback, and the method includes the following steps.

Refer to FIG. 12. FIG. 12 shows a CP solution in MO-EDT. Steps 1201 to 1204 are similar to steps 1001 to 1004 in FIG. 10. Details are not described herein again.

Step 1205: The CU sends a second message to the DU.

Specifically, the CU sends the second message to the DU, where the second message includes an RRC message and an MO-EDT indication, and the RRC message includes downlink data.

The MO-EDT indication is used to indicate that the RRC message is used for MO-EDT.

In a possible implementation, the second message may be a UE CONTEXT RELEASE COMMAND message, a DL RRC MESSAGE TRANSFER message, or a UE CONTEXT SETUP REQUEST message.

In a possible implementation, the RRC message is an RRC early data complete message, and the downlink data is encapsulated in the RRC early data complete message.

Then, the DU determines, based on a size (size) of the received RRC message, whether the RRC message can be sent to the UE through one transmission. If the RRC message can be sent to the UE through one transmission, step 1206*a* is performed. If the RRC message cannot be sent to the UE through one transmission, step 1206*b* is performed.

In a possible implementation, the second message may further include a CP MO-EDT indication, and the indication is used to indicate that the RRC message is used for CP MO-EDT.

Step 1206*a*: The DU sends an Msg4 to the UE.

Msg4 is an RRC early data complete message including the downlink data.

In this case, the CP MO-EDT procedure ends.

Step 1206*b*: The DU sends a first indication to the CU.

Specifically, the DU sends the first indication to the CU, where the first indication is used to indicate fallback of MO-EDT or indicate failure of MO-EDT.

In a possible implementation, the first indication may be carried in an RRC delivery status (RRC Delivery Status) message.

After the CU receives the first indication, the CU generates an RRC connection setup message as an Msg4.

Step 1207: The CU sends the UE by using the DU, the Msg4 in which the RRC connection setup message is encapsulated.

In this case, the MO-EDT procedure falls back to an RRC connection setup procedure.

Refer to FIG. 13. FIG. 13 is an UP solution in MO-EDT. Steps 1301 to 1304 are similar to steps 1001 to 1004 in FIG. 10. Details are not described herein again.

Step 1305: The CU sends a second message to the DU.

Specifically, the CU sends the second message to the DU, where the second message includes an RRC message and an MO-EDT indication. If there is downlink data, the CU further sends the downlink data to the DU.

The MO-EDT indication is used to indicate that the RRC message is used for MO-EDT.

In a possible implementation, the second message may be a UE CONTEXT RELEASE COMMAND message, a DL RRC MESSAGE TRANSFER message, or a UE CONTEXT SETUP REQUEST message.

In a possible implementation, the RRC message is an RRC connection release message.

Then, the DU determines, based on the received RRC message and a size (size) of the downlink data, whether the RRC message and the downlink data can be sent to the UE through one transmission. If the RRC message and the downlink data can be sent to the UE through one transmission, step 1306a is performed. Otherwise, step 1306b is performed.

In a possible implementation, the second message may further include an UP MO-EDT indication, and the indication is used to indicate that the RRC message is used for UP MO-EDT.

Step 1306a: The DU sends an Msg4 to the UE.

Msg4 includes the downlink data and an RRC connection release message.

In this case, the UP MO-EDT procedure ends.

Step 1306b: The DU sends a first indication to the CU.

Specifically, the DU sends the first indication to the CU, where the first indication is used to indicate fallback of MO-EDT or indicate failure of MO-EDT.

In a possible implementation, the first indication may be carried in an RRC delivery status (RRC Delivery Status) message.

After the CU receives the first indication, the CU generates an RRC connection resume message as an Msg4.

Step 1307: The CU sends the UE by using the DU, the Msg4 in which the RRC connection resume message is encapsulated.

In this case, the MO-EDT procedure falls back to an RRC connection resume procedure.

In this embodiment, the CU sends the downlink data and the Msg4 to the DU, and the DU may determine whether to perform fallback. This can prevent the DU from sending the CU a data volume limitation information in the Msg4.

Refer to FIG. 14. This embodiment of this application is different from the embodiments in FIG. 12 and FIG. 13, the CU sends two messages to the DU. This can reduce interaction between the CU and the DU, and further reduces a delay for setting up/resuming an RRC connection.

Steps 1401 to 1404 are the same as steps 1001 to 1004 in FIG. 10.

CP Solution

Step 1405: The CU sends a first message to the DU, where the first message includes a first RRC message, a second RRC message, and an MO-EDT indication, the first RRC message may be RRC early data complete, the second RRC message may be RRC connection setup, and the MO-EDT indication is used to indicate that the first RRC message is used for MO-EDT, or the MO-EDT indication is used to indicate that the second RRC message is used for MO-EDT fallback.

The first message may be a UE CONTEXT SETUP REQUEST, a UE CONTEXT RELEASE COMMAND, or DL RRC MESSAGE TRANSFER.

The DU determines whether the first RRC message can be sent to the UE through one transmission; and if the first RRC message can be sent to the UE through one transmission, goes to step 1406a; otherwise, goes to step 1406b.

In a possible implementation, the DU determines the first RRC message or the second RRC message according to the MO-EDT indication.

Step 1406a: The DU sends the first RRC message to the UE.

Step 1406b: The DU sends the second RRC message to the UE.

Step 1407: The DU sends a second indication to the UE, where the second indication is used to indicate whether the DU sends the first RRC message or the second RRC message to the UE. This step is optional.

The second indication may be carried in a UE CONTEXT SETUP RESPONSE, UE CONTEXT RELEASE COMPLETE, or an RRC DELIVERY REPORT.

UP Solution

Step 1405: The CU sends a first message to the DU, where the first message includes a first RRC message, a second RRC message, and an MO-EDT indication, the first RRC message may be RRC connection release, the second RRC message may be RRC connection resume, and the MO-EDT indication is used to indicate that the first RRC message is used for MO-EDT, or the MO-EDT indication is used to indicate that the second RRC message is used for MO-EDT fallback. The CU further sends downlink data to the DU.

The first message may be a UE CONTEXT SETUP REQUEST, a UE CONTEXT RELEASE COMMAND, or DL RRC MESSAGE TRANSFER.

In a possible implementation, the CU sends a second indication to the DU, where the second indication is used to indicate whether there is the downlink data.

The DU determines whether the first RRC message and the downlink data can be sent to the UE through one transmission; and if the first RRC message and the downlink data can be sent to the UE through one transmission, goes to step 1406a; otherwise, goes to step 1406b.

In a possible implementation, the DU determines the first RRC message or the second RRC message according to the MO-EDT indication.

In a possible implementation, the DU determines, according to the second indication, that there is the downlink data that needs to be sent.

Step 1406a: The DU sends the first RRC message and the downlink data to the UE.

Step 1406b: The DU sends the second RRC message to the UE.

In a possible implementation, the DU further sends the downlink data to the UE.

Step 1407: The DU sends a second indication to the UE, where the second indication is used to indicate whether the DU sends the first RRC message or the second RRC message to the UE. This step is optional.

The second indication may be carried in a UE CONTEXT SETUP RESPONSE, UE CONTEXT RELEASE COMPLETE, or an RRC DELIVERY REPORT.

2. Perform Data Transmission by Using a PUR Method

Figure 15:
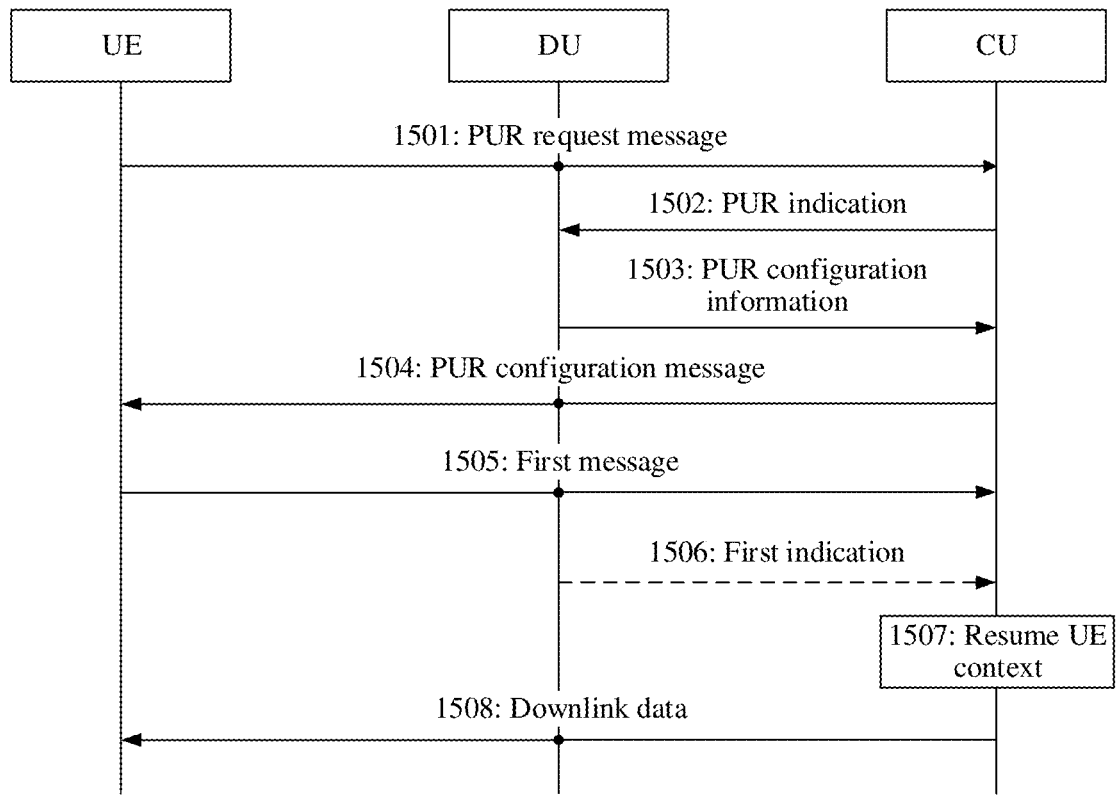
FIG. 15 is a schematic flowchart of another embodiment of a data transmission method according to an embodiment of this application.

Refer to FIG. 15. FIG. 15 is a schematic flowchart of another embodiment of a data transmission method according to an embodiment of this application. The method includes the following steps.

Step 1501: UE sends a PUR resource request message to a CU.

Specifically, the UE sends the PUR resource request message to the CU by using a DU. The PUR resource request message is used to request for a PUR resource.

Step 1502: The CU sends a PUR indication to the DU.

The PUR indication is used by the CU to request for PUR configuration information from the DU.

In a possible implementation, the PUR configuration information may include at least one of the following: a period of the PUR resource, a TBS, an MCS, a quantity of repetitions, a C-RNTI, and the like.

In a possible implementation, the PUR indication may be included in a UE CONTEXT SETUP REQUEST message or a UE CONTEXT MODIFICATION REQUEST message.

Step 1503: The DU sends the PUR configuration information to the CU.

In a possible implementation, the PUR configuration information may be included in a UE CONTEXT SETUP RESPONSE message or a UE CONTEXT MODIFICATION REQUEST message.

Step 1504: The CU sends the PUR configuration information to the UE.

Specifically, the CU sends the PUR configuration information to the UE by using the DU. This is the same as step A32 in FIG. 3.

Step 1505: The UE sends uplink data to the CU.

In a CP solution, the UE sends the uplink data to the DU, where the uplink data carries a CCCH SDU, and the CCCH SDU carries a first RRC message, for example, an RRC early data request message. A MAC layer in the DU determines that the MAC SDU is a CCCH SDU. Further, the DU may determine, based on a size (size) of the CCCH SDU, that the CCCH SDU is a CCCH SDU used for MO-EDT, that is, the CCCH SDU carries the uplink data; and then performs step 1505*a*. If determining that the CCCH SDU is not a CCCH SDU used for MO-EDT, the DU does not perform step 1505*a*. For example, the CCCH SDU not used for MO-EDT is usually 48 bits, and the CCCH SDU used for MO-EDT is usually greater than 48 bits.

In an UP solution, the uplink data includes a CCCH SDU and a DTCH SDU. The CCCH SDU carries a first RRC message, for example, an RRC connection resume request message or an RRC resume request message, and the DTCH SDU carries the uplink data. When the DU determines that there is the DTCH SDU, the DU determines that the uplink data is used for MO-EDT, and then performs step 1505*a* and step 1505*b*. If there is no DTCH SDU, the DU does not perform step 1505*a* and step 1505*b*.

Step 1505*a*: The DU sends a fourth message to the CU, where the fourth message includes the first RRC message and a data volume limitation information of downlink data.

In a possible implementation, the data volume limitation information of the downlink data may be a maximum data volume of the downlink data that is allowed to be scheduled, may be a maximum TBS of the downlink data that is allowed to be scheduled, or may be a second TBS threshold of the downlink data.

In a possible implementation, the data volume limitation information of the downlink data may be sent to the CU before the DU receives the uplink data. In this case, the data volume limitation information may be used for all UEs that initiate MO-EDT, that is, the data volume limitation information is cell-level information, rather than for individual UEs.

In a possible implementation, the cell-level data volume limitation information may be included in a configuration update message.

In a possible implementation, the fourth message may be an initial uplink RRC message transfer (Initial UL RRC Message Transfer) message.

In a possible implementation, the fourth message may further include a first indication, for example, an MO-EDT indication, and the first indication is used to indicate the UE to transmit the data by using a method for early transmission of uplink data.

Step 1505*b*: The DU sends the uplink data to the CU.

In the CP solution, the uplink data is encapsulated in the NAS PDU, and the NAS PDU is included in the first RRC message. The CU receives the fourth message, extracts the NAS PDU, and sends the NAS PDU to a core network device (for example, an MME or an AMF). The core network device establishes a connection for the UE.

In the UP solution, the uplink data is encapsulated in the DTCH SDU. The DU receives the third message, and sends the first RRC message to the CU. The CU resumes UE context based on the first RRC message. Then, the CU configures the UE context for the DU. The DU parses the DTCH SDU based on the UE context to generate the PDCP PDU, and sends the PDCP PDU to the CU.

Step 1505*c*: The CU sends a fifth message to the UE by using the DU.

In the CP solution and the UP solution, the CU may receive the downlink data from the core network device. In this case, the CU may determine, based on a data volume of the downlink data and the received data volume limitation information of the downlink data, whether to send a PUR message to the UE, that is, determine whether the downlink data can be sent to the UE through one transmission (or one TB).

Specifically, in the UP solution in MO-EDT, the uplink data includes the RRC connection resume request message and the uplink data. The DU encapsulates, in INITIAL UL RRC MESSAGE TRANSFER, the RRC connection resume request message encapsulated in the CCCH SDU, to send to the CU. If the DU determines that the process is MO-EDT, the INITIAL UL RRC MESSAGE TRANSFER further includes the indication information that indicates MO-EDT and/or the data volume limitation information of the downlink data. After receiving the INITIAL UL RRC MESSAGE TRANSFER message, the CU resumes the UE context information based on the RRC connection resume request message and sends the UE CONTEXT SETUP REQUEST message to the DU. The DU establishes the UE context based on the message, parses the uplink data included in the uplink message, and sends the uplink data to the UE. If there is the downlink data arriving at the CU, the CU determines, based on the data volume of the downlink data and the data volume limitation information of the downlink data, a message to be sent in the downlink data. For example, if the data volume of the downlink data is less than or equal to the allowed data volume of the downlink data indicated in the data volume limitation information of the downlink data, the CU determines to send the RRC connection release message in the downlink data, send the downlink data to the DU by using the UP-PDCP, and send the RRC connection release message by using the CP-PDCP. After receiving the downlink data and the RRC connection release message, the DU multiplexes the downlink data and the RRC connection release message into one MAC PDU, and sends the MAC PDU to the UE by using the PHY. If the data volume of the downlink data is greater than the allowed data volume of the downlink data, the CU determines to send an RRC connection resume message in the downlink data and resumes an RRC connection to send the downlink data.

Specifically, the UE sends the uplink data to the CU on the PUR resource by using the DU, which is the same as step 301 in FIG. 3.

In a possible implementation, in step 1505, the UE sends the first message to the DU, where the first message includes a MAC SDU in an RRC message and a MAC SDU of the uplink data. After receiving a MAC PDU in the first message, the DU first decodes a MAC SDU corresponding to a CCCH channel, and sends the MAC SDU to the CU. The CU resumes the UE context by using steps 1507 and 1508. Then, the CU sends a UE context setting message to the DU, and the DU sends the MAC SDU of the uplink data to the CU. Then, step 1509 and step 1510 are performed.

Step 1506: The DU sends a first indication to the CU.

Specifically, the DU sends the first indication to the CU, where the first indication identifies a resource index used by the DU to indicate the CU that the message in step 1505 is received. The step is optional.

Step 1507: The CU sends a UE context resume request message to the MME.

Specifically, the CU may determine, based on the resource index, the UE that uses the resource, and then send the UE context resume request message to the MME.

Step 1508: The CU sends downlink data to the UE.

If there is the downlink data, an S-GW sends the downlink data to the MME.

The MME sends a NAS message including the downlink data to an eNB, and indicates a downlink data size.

If there is no downlink data or a data volume of the downlink data is small, the eNB sends the UE RRC early data complete carrying the downlink data.

Specifically, in step 1507, if the MME receives the downlink data for the UE sent by the S-GW, the MME sends the CU a downlink NAS transport (DL NAS transport) message including the downlink data; if the MME does not receive the downlink data for the UE, the MME sends a connection setup indication (connection establishment indication) message to the CU.

In addition, in step 1508, the CU may send the RRC early data complete message to the UE. Specifically, if the CU does not receive the downlink data for the UE, or the data volume of the downlink data for the UE received by the CU is small, the eNB sends the CU the RRC early data complete (RRC Early Data Complete) message carrying the downlink data. In addition, an S1 connection of the UE is released between the CU and the MME, the MME interacts a modify bearer (modify bearer) message with the S-GW, and the UE is in an IDLE mode. In the CP solution, the UE is also in the IDLE mode.

The foregoing describes the early transmission part of the uplink data in the data transmission method in embodiments of this application, and the following describes the early transmission part of the downlink data.

Figure 16:
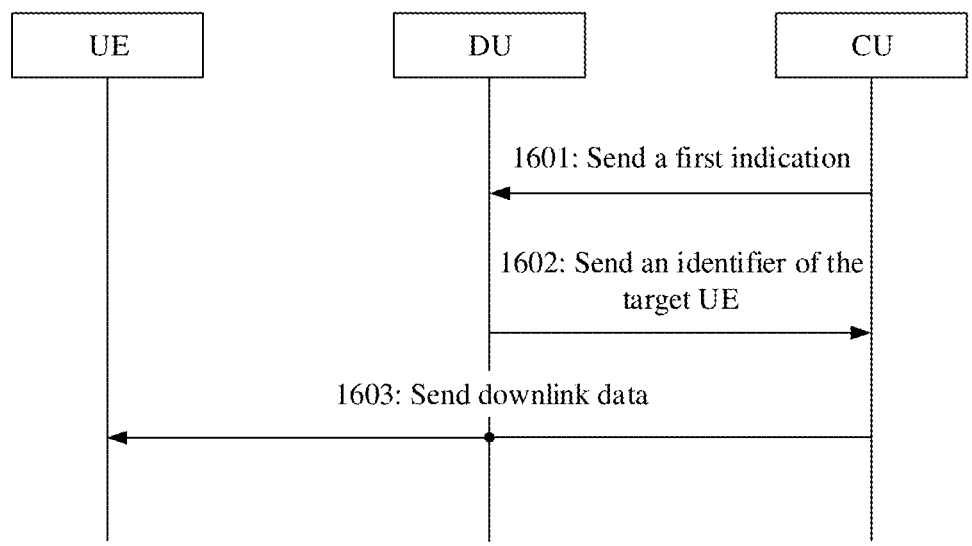
FIG. 16 is a schematic flowchart of another embodiment of a data transmission method according to an embodiment of this application.

Refer to FIG. 16. FIG. 16 is a schematic flowchart of an embodiment of an early data transmission method according to an embodiment of this application. The method includes the following steps.

Step 1601: A CU sends a first indication to a DU.

In this step, in a network architecture in which the centralized unit CU and the distributed unit DU are separated, when the CU has downlink data to be sent to target UE, the CU may send the downlink data to the target UE through early transmission of downlink data. The CU sends the first indication to the DU, where the first indication may include an indication about downlink data to the target UE.

Specifically, before step 1601, the CU may determine, based on a first paging message from a core network device, that the downlink data needs to be sent to the target UE. The first paging message may include the downlink data or a data volume of the downlink data. Then, the CU may send a second paging message to the DU based on the first paging message, so that the DU searches for the corresponding target UE in a service range based on the second paging message.

In addition, similar to that in the foregoing solution in which the data is transmitted through early transmission of uplink data, the CU or the DU may further determine whether the downlink data is transmitted through early transmission of downlink data. When the DU performs determining, the CU may further include the data volume of the downlink data in the downlink data indication, so that the DU performs determining based on a preset TBS threshold used for early transmission of downlink data and the data volume of the downlink data, and feeds back a determining result to the CU. When the CU performs determining, the CU may obtain the TBS threshold from the DU, or the DU actively sends the TBS threshold to the CU. Then, the CU determines, based on the TBS threshold, whether to transmit the downlink data through early transmission of downlink data.

Step 1602: The DU sends an identifier of the target UE to the CU.

In this step, when the DU determines that the target UE is within the service range of the DU, the CU may receive the identifier of the target UE sent by the DU.

Specifically, after receiving the second paging message sent by the CU, the DU may perform Uu paging on the UE within the service range by using the second paging message. If receiving a response message from the target UE, the DU determines that the target UE is within the service range of the DU, and the DU sends the identifier of the target UE to the CU.

Step 1603: The CU sends the downlink data to the UE.

In this step, when the CU determines, in step 1602, that the target UE is within the service range of the DU, the CU may send the downlink data to the target UE through early transmission of downlink data.

In this embodiment, in the network architecture in which the centralized unit CU and the distributed unit DU are separated, when there is the downlink data to be sent to the target UE, the CU may send the downlink data to the target UE through early transmission of downlink data. The CU sends the first indication to the DU, where the first indication may include an indication about downlink data to the target UE, so that when the DU determines that the target UE is within the service range of the DU, the CU may receive the identifier of the target UE sent by the DU. In this way, the CU can send the downlink data to the target UE by using an MSG2 or an MSG4 through early transmission of downlink data, thereby implementing early transmission of downlink data in a CU-DU separation scenario.

In this embodiment of this application, in step 1603, the CU may send the target downlink data to the target UE by using the MSG2, or may send the target downlink data to the target UE by using the MSG4. The following describes the two cases by using specific embodiments.

1. Send the Downlink Data by Using the Msg2

The DU interacts MT-EDT related information with the CU, to assist the CU in determining whether to transmit the downlink data by using an MT-EDT method. Further, the CU indicates MT-EDT to the DU, and may request a random access RACH resource and a C-RNTI from the DU, so that the DU sends the RACH resource and the C-RNTI to the CU by using a paging message. Finally, the DU sends an RACH resource index and the like to the CU, so that the CU can determine that the UE is in the service range of the CU, and the CU can request for the downlink data from the core network device. In addition, specifically, the DU may directly send data volume limitation information through the MT-EDT to the CU, and the CU determines whether to perform MT-EDT, or the DU may determine the process. The following separately provides descriptions by using FIG. 17 and FIG. 18.

Figure 17:
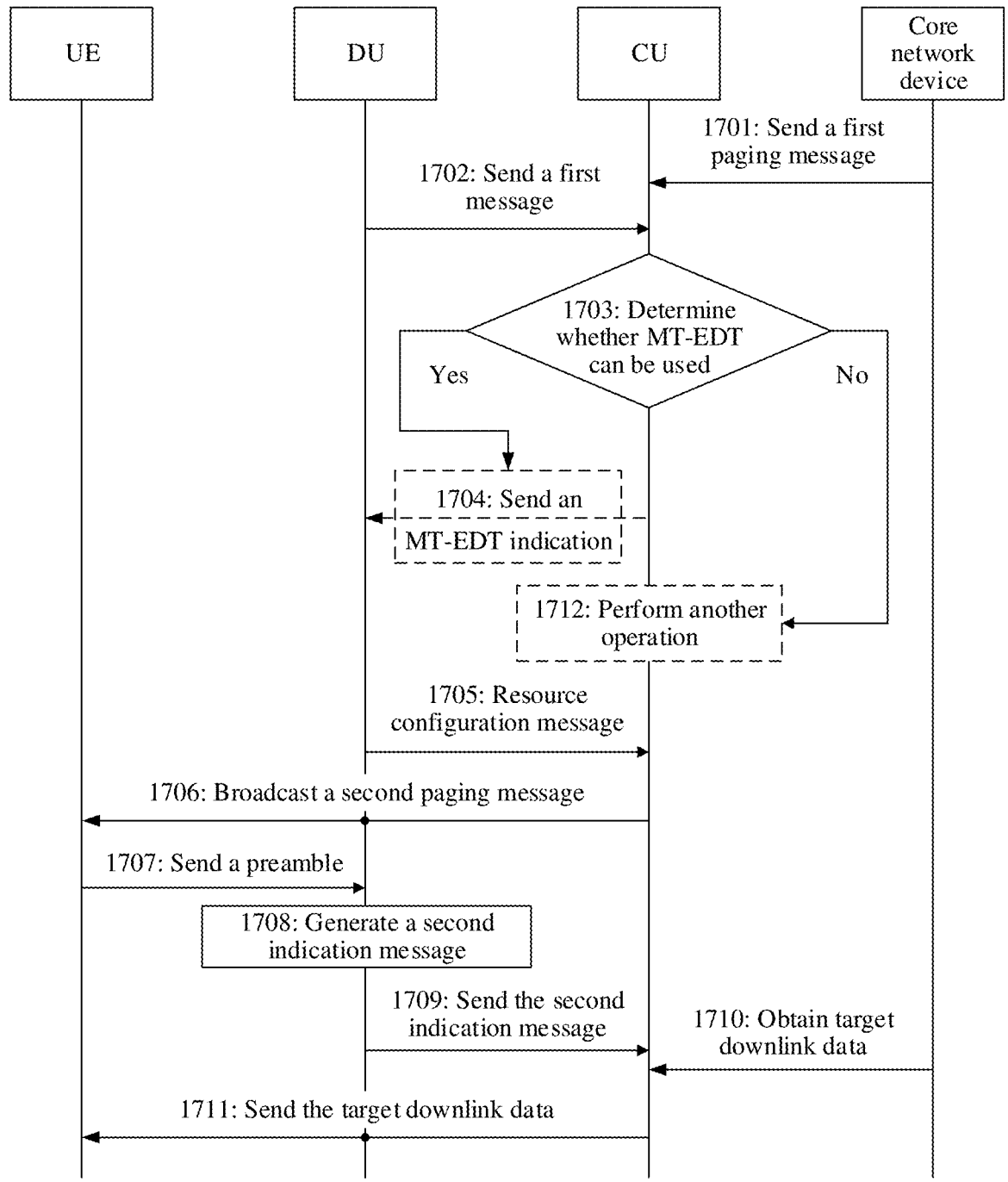
FIG. 17 is a schematic flowchart of another embodiment of a data transmission method according to an embodiment of this application.

Refer to FIG. 17. FIG. 17 is a schematic flowchart of another embodiment of a data transmission method according to an embodiment of this application. The method includes the following steps.

Step 1701: A core network device sends a first paging message to a CU.

Specifically, the first paging message sent by the core network device to the CU may include data volume limitation information of downlink data. In addition, the first paging message may further include the downlink data, or may not include the downlink data. This is not limited herein.

Step 1702: A DU sends a first message to the CU.

Specifically, the DU sends the first message to the CU, where the first message includes the data volume limitation information of the downlink data.

In a possible implementation, the first message may further include first capability information, and the first capability information is used to indicate that the DU supports MT-EDT.

In a possible implementation, the first message may be a RESET message, an F1 SETUP REQUEST message, a GNB-DU CONFIGURATION UPDATE message, or a GNB-DU RESOURCE COORDINATION RESPONSE message.

Step 1703: The CU determines whether MT-EDT can be used.

Specifically, this step is the same as step A42 in the embodiment in FIG. 4. That is, the CU determines, based on a downlink data size and the data volume limitation information of the downlink data in an S1 paging message, whether to use MT-EDT.

Step 1704: If the CU determines that MT-EDT is used, the CU sends an MT-EDT indication to the DU, to request the DU to allocate an RACH resource and a C-RNTI.

In a possible implementation, the MT-EDT indication is carried in an F1 SETUP RESPONSE message, a GNB-DU CONFIGURATION UPDATE ACKNOWLEGDE message, a GNB-CU CONFIGURATION UPDATE message, or a GNB-DU RESOURCE COORDINATION REQUEST message.

In a possible implementation, the CU sends the DU an identifier of UE, an identifier carried on UE, or an F1AP ID.

Step 1705: The DU sends a resource configuration message to the CU.

Specifically, the DU allocates the resource configuration message according to the MT-EDT indication, and sends the CU the resource configuration message including the RACH resource and the C-RNTI.

The RACH resource and the C-RNTI may be carried in a RESET message, an F1 SETUP REQUEST message, a GNB-DU CONFIGURATION UPDATE message, or a GNB-DU RESOURCE COORDINATION RESPONSE message.

Step 1706: The CU broadcasts a Uu paging message to the UE.

Specifically, the CU sends the Uu paging message to the UE by using the DU. If the CU receives a paging message from an MME, the CU sends the paging message (which may be referred to as Uu paging) to the UE. The paging message carries an NAS ID (for example, an S-TMSI) of the paging, the C-RNTI, and the RACH resource. The C-RNTI is used to process, for example, scramble, data when the UE sends the data, or is used by the UE to listen to a PDCCH, where the PDCCH is used to schedule the UE to perform data transmission. The RACH resource includes an RACH time-frequency resource, for example, carrier information, resource block (Resource Block, RB) information, time information, and a preamble. The paging message may further include coverage enhancement level (Coverage enhancement Level, CEL) information. For example, when performing data transmission, the UE needs to repeatedly send uplink data or repeatedly receive downlink data in eMTC and NB-IoT technologies. Therefore, repetition quantities of different levels are defined. For example, a coverage enhancement level 0 includes repetition quantities {1, 2, 4, 8}, a coverage enhancement level 1 includes repetition quantities {16, 32, 64}, and a coverage enhancement level 2 includes repetition quantities {128, 256, 512}. A coverage range of a signal can be improved through repeat transmission.

Step 1707: The UE sends the DU the preamble carried in the paging message.

Step 1708: The DU generates a second indication, where the second indication is used to indicate that the UE has sent the preamble carried in the paging message.

In a possible implementation, the second indication may be an RACH resource index or a preamble index.

In a possible implementation, the second indication may be the C-RNTI.

In a possible implementation, the second indication may be an MT-EDT indication.

In a possible implementation, the second indication may be an identifier of the UE, an identifier carried on the UE, or an F1AP ID.

In a possible implementation, the RACH resource index may be a preamble index, and is used by the DU to indicate the CU that the UE using the preamble is in the service range of the DU.

Step 1709: The DU sends the second indication to the CU.

In this step, the DU sends the second indication to the CU, so that the CU stores the RACH resource and the C-RNTI, and the CU determines, based on the RACH resource index, that the UE is in the service range of the DU.

Step 1710: The CU obtains downlink data.

In this step, when the CU determines, according to the second indication, that the UE is in the service range of the DU, the CU may obtain the downlink data from the core network device.

Specifically, if the first paging message in step 1701 carries the downlink data, the CU may directly obtain the downlink data from the first paging message. If the first paging message in step 1701 does not carry the downlink data, the CU may send a data request for the downlink data to the core network device before this step, so that the core network device sends the downlink data to the CU.

Step 1711: The CU sends the downlink data to the UE.

In this step, when determining to obtain the downlink data for the UE in step 1710, the CU may send the downlink data to the specified UE by using an MSG2, so as to complete MT-EDT and implement a solution for early transmission of downlink data in the data transmission method in this embodiment.

Step 1712: When the CU determines, in step 1703, that MT-EDT cannot be used, the CU performs another operation. For example, the CU may not perform early transmission of downlink data, may interact data with the DU to establish UE context to transmit the downlink data, or may perform another step. This is not specifically limited herein.

Figure 18:
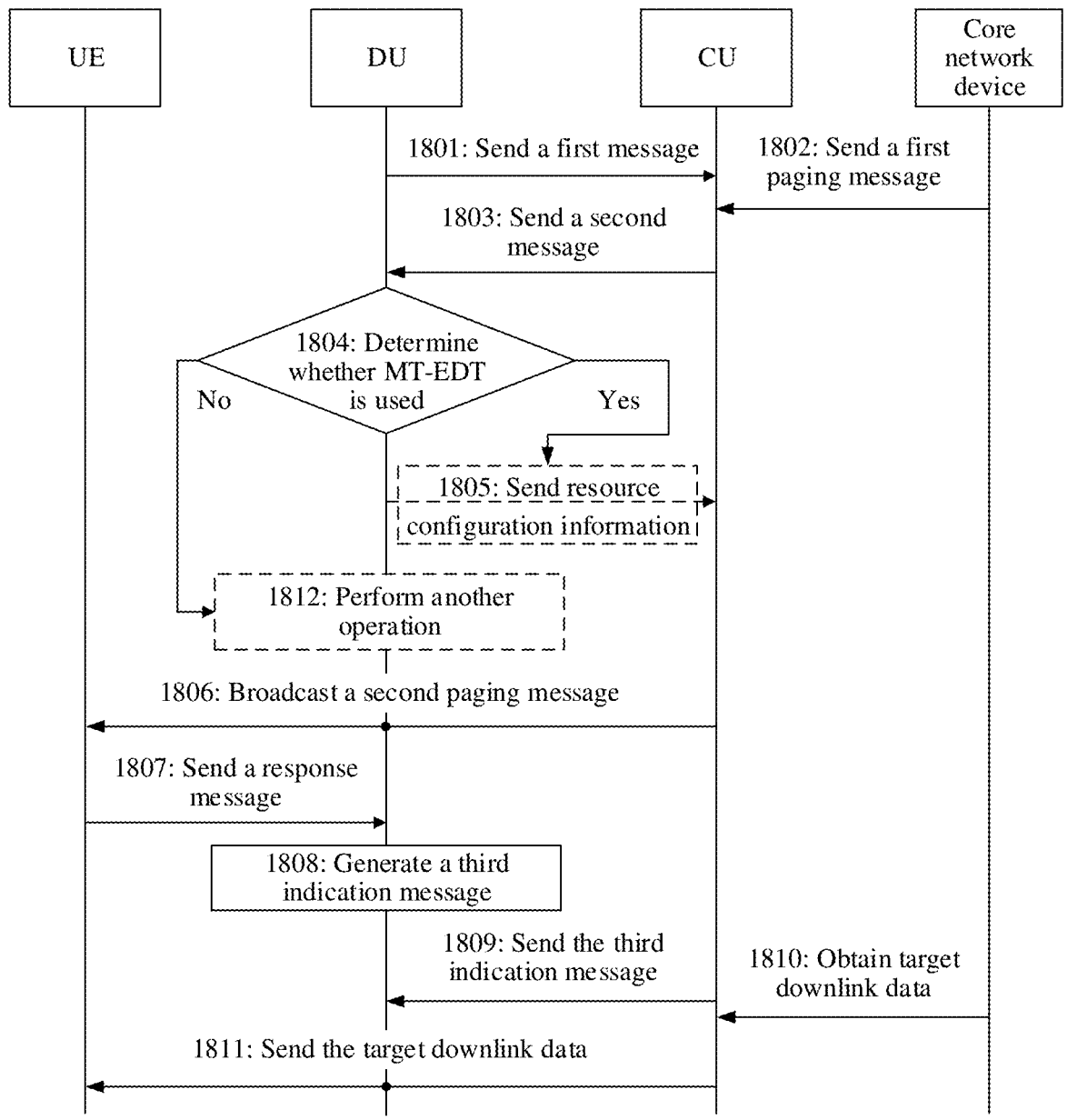
FIG. 18 is a schematic flowchart of another embodiment of a data transmission method according to an embodiment of this application.

Refer to FIG. 18. FIG. 18 is a schematic flowchart of another embodiment of an early data transmission method according to an embodiment of this application. The method includes the following steps.

Step 1801: A DU sends a first message to a CU.

Specifically, the first message may include first capability information, and the first capability information is used to indicate that the DU supports MT-EDT.

In a possible implementation, the first message may be a RESET message, an F1 SETUP REQUEST message, a GNB-DU CONFIGURATION UPDATE message, or a GNB-DU RESOURCE COORDINATION RESPONSE message.

Step 1802: A core network device sends a first paging message to the CU.

Specifically, the first paging message sent by the core network device to the CU may include a data volume of downlink data. In addition, the first paging message may further include the downlink data, or may not include downlink data. This is not limited herein.

Step 1803: The CU sends a second message to the DU.

Specifically, after receiving the first paging message in step 1802, the CU may send the second message to the DU. The second message may include the data volume of the downlink data.

Step 1804: The DU determines whether MT-EDT is used; and if MT-EDT is used, performs step 1805, and if MT-EDT is not used, performs step 1812.

Specifically, in this step, the DU may determine, based on a preset TBS threshold, whether to transmit the downlink data through MT-EDT. The determining basis is a value relationship between the preset TBS threshold and the data volume of the downlink data received in step 1803. If the TBS threshold is less than the data volume of the downlink data, step 1812 is performed. If the TBS threshold is not less than the data volume of the downlink data, step 1805 is performed.

Step 1805: The DU sends resource configuration information to the CU.

Specifically, when the DU determines that MT-EDT is used, the DU sends the resource configuration message to the CU. The resource configuration message may include an RACH resource and a C-RNTI.

In addition, the RACH resource and the C-RNTI may be carried in a RESET message, an F1 SETUP REQUEST message, a GNB-DU CONFIGURATION UPDATE message, or a GNB-DU RESOURCE COORDINATION RESPONSE message.

Step 1806 to step 1812 are similar to step 1706 to step 1712 in FIG. 17. Details are not described herein again.

In this embodiment, specifically, in a process in which the DU determines, based on the downlink data size (DL data size), whether MT-EDT can be used, the determining process is set to be implemented by the DU. This can reduce running steps of the CU.

Figure 19:
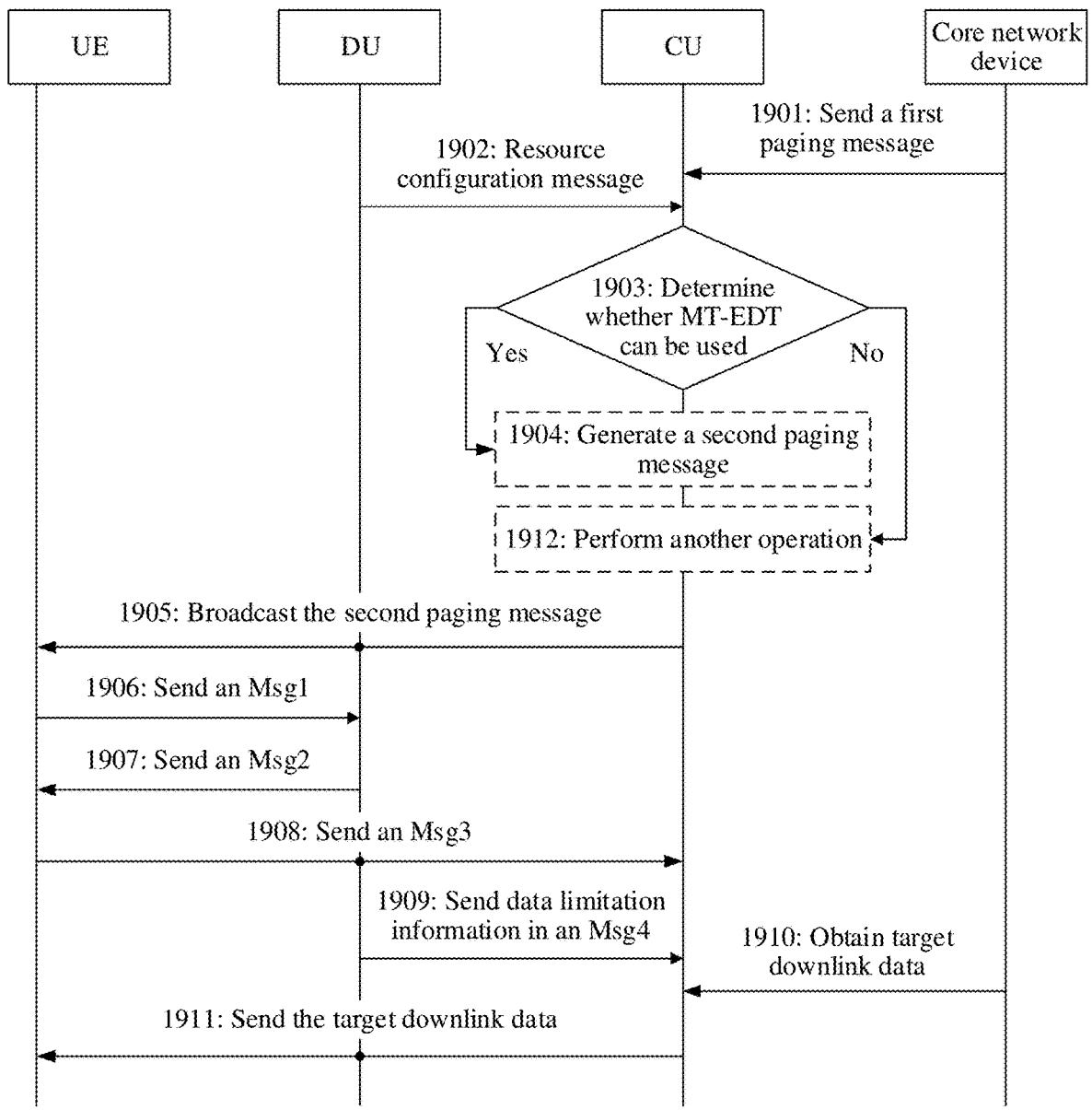
FIG. 19 is a schematic flowchart of another embodiment of a data transmission method according to an embodiment of this application.

Refer to FIG. 19. FIG. 19 is a schematic flowchart of another embodiment of a data transmission method according to an embodiment of this application. The method includes the following steps.

Step 1901: A DU sends a first message to a CU, where the first message includes data volume limitation information of downlink data and capability information indicating that MT-EDT is supported.

In a possible implementation, the first message may be a RESET message, an F1 SETUP REQUEST message, a GNB-DU CONFIGURATION UPDATE message, or a GNB-DU RESOURCE COORDINATION RESPONSE message.

In a possible implementation, the data volume limitation information of the downlink data may indicate an allowed maximum TBS in an Msg4.

In a possible implementation, the first message may not include the data volume limitation information of the downlink data, and the data volume limitation information is carried in step 1909.

Step 1902: An MME sends a first paging message to the CU.

Specifically, the MME sends the CU the first paging message, namely, an S1 paging message, where the S1 paging message carries an S-TMSI and a data volume (DL data size) of the downlink data.

Step 1903: The CU determines whether MT-EDT can be used; and if MT-EDT can be used, performs step 1904, and if MT-EDT cannot be used, performs step 1912.

Step 1904: If the CU determines that MT-EDT is used, the CU generates a second paging message.

Step 1905: The CU broadcasts the second paging message to the UE.

The second paging message may include an MT-EDT indication. In a possible implementation, the CU may determine, based on the data volume limitation information of the downlink data and the capability information indicating that MT-EDT is supported in step 1901, and the data volume of the downlink data in step 1902, that MT-EDT is used; or the CU may determine, based on the capability information indicating the MT-EDT is supported in step 1901 and the data volume of the downlink data in step 1902, that MT-EDT is used.

Step 1906: UE sends an Msg1 to the DU.

Specifically, the UE sends the DU the Msg1, namely, a random access preamble preamble.

Step 1907: DU sends an Msg2 to the UE.

Step 1908: UE sends an Msg3 to the CU.

In a possible implementation, the UE may send the DU the preamble used for MO-EDT. In this way, the DU can allocate, based on the preamble used for the MO-EDT, a large UL grant to the UE in step 1906 for sending the Msg3. For example, in a CP solution, the UE sends the preamble used for MO-EDT, and then the UE sends an RRC early data request message in the Msg3.

In a possible implementation, the UE may send a general preamble to the DU. In this way, the DU sends, based on the preamble, an RAR to the UE in step 1907 for sending the Msg3. For example, in an UP solution, the UE sends the preamble, and then the UE sends an RRC connection resume request message in the Msg3, where the message carries MT-EDT indication information.

Step 1909: The DU sends data volume limitation information of second downlink data to the CU.

If the data volume limitation information of the downlink data is not carried in step 1901, there is definitely step 1909.

If the data volume limitation information of the downlink data is carried in step 1901, step 1909 is optional.

In a possible implementation, the DU may determine, based on a fact that the preamble in step 1906 is a preamble used for MO-EDT, to perform step 1909.

For steps 1910 and 1911, refer to the steps in the conventional technology.

Step 1911: If the CU determines that the downlink data can be sent by using the Msg4, the CU sends the Msg4 to the UE by using the DU, where the Msg4 carries the downlink data.

In a possible implementation, the Msg4 may be an RRC connection release message (in the UP solution) or an RRC early data complete message (in the CP solution).

In a possible implementation, if the CU determines that the downlink data cannot be sent by using the Msg4, the CU sends an RRC connection resume message (in the UP solution) or an RRC connection setup message (in the CP solution) to the UE by using the DU.

In this embodiment, the DU sends the CU the data volume limitation information of the downlink data, to assist the CU in determining whether to perform downlink data transmission through Msg4-based MT-EDT.

The foregoing describes the data transmission method in the CU-DU separation network architecture. The following describes, with reference to the accompanying drawings, a centralized unit CU and a distributed unit DU provided in embodiments of this application.

Figure 20:
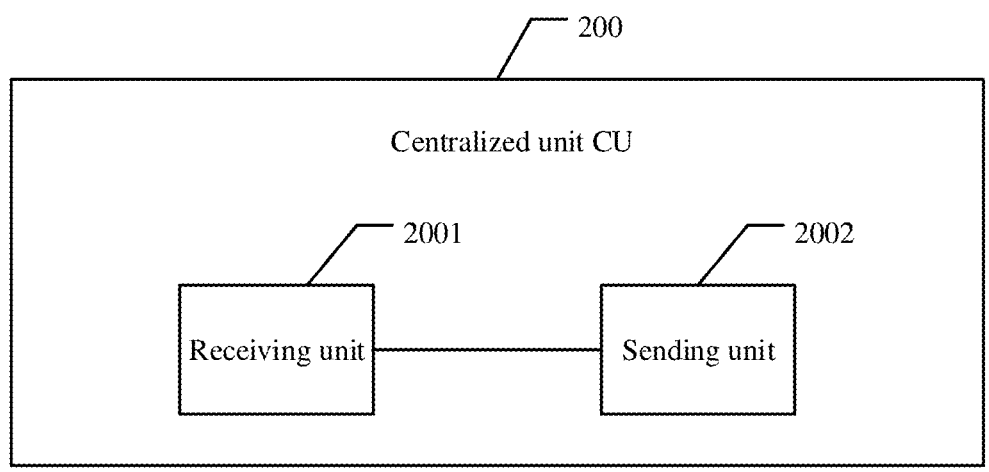
FIG. 20 is a schematic diagram of an embodiment of a centralized unit CU according to an embodiment of this application.

As shown in FIG. 20, a centralized unit CU 200 in an embodiment of this application may include: a receiving unit 2001 and a sending unit 2002.

In an implementation process, the receiving unit 2001 is configured to receive a first message sent by a distributed unit DU, where the first message includes a first transport block size TBS threshold, and the first TBS threshold is used for early transmission of uplink data; the sending unit 2002 is configured to send the first TBS threshold to UE; and the receiving unit 2001 is further configured to receive uplink data that is sent by the UE based on the first TBS threshold.

In a possible implementation, the receiving unit 2001 is further configured to: receive a second TBS threshold sent by the DU, where the second TBS threshold is used for early transmission of downlink data.

In a possible implementation, the receiving unit 2001 is further configured to: receive a first indication sent by the DU, where the first indication is used to indicate early transmission of uplink data.

In a possible implementation, the receiving unit 2001 is specifically configured to: receive initial uplink RRC message transfer sent by the DU, where the initial uplink RRC message transfer includes the second TBS threshold and/or the first indication.

In a possible implementation, if the initial uplink RRC message transfer includes the second TBS threshold or the first indication, the sending unit 2002 is further configured to: send a UE context setting request to the DU.

In a possible implementation, the sending unit 2002 is further configured to: send a second indication to the DU, where the second indication is used to indicate early transmission of uplink data or early transmission of downlink data.

In a possible implementation, the sending unit 2002 is further configured to: send a second message to the DU, where the second message carries an RRC message and the second indication, and the second message includes downlink RRC message transfer or a UE context release command.

In a possible implementation, the receiving unit 2001 is further configured to: receive a third indication sent by the DU, where the third indication is used to indicate failure of early transmission of uplink data, or fallback of early transmission of uplink data, or failure of early transmission of downlink data, or fallback of early transmission of downlink data.

In another implementation process, the sending unit 2002 is configured to send a first indication to a distributed unit DU, where the first indication includes a downlink data indication of target UE; the receiving unit 2001 is configured to receive an identifier of the target UE sent by the DU; and the sending unit 2002 is further configured to send downlink data to the target UE through early transmission of downlink data.

In a possible implementation, the sending unit 2002 is specifically configured to: send a paging message to the DU, where the paging message includes the first indication.

In a possible implementation, the receiving unit 2001 is further configured to: receive a first TBS threshold sent by the DU, where the first TBS threshold is used for early transmission of downlink data.

In a possible implementation, the indication about the downlink data to the target UE includes a data volume of downlink data.

It should be noted that content such as information exchange and an execution process between the modules of the centralized unit CU 200 is similar to that in the method embodiments of this application. For specific content, refer to the descriptions in the method embodiments of this application. Details are not described herein again.

Figure 21:
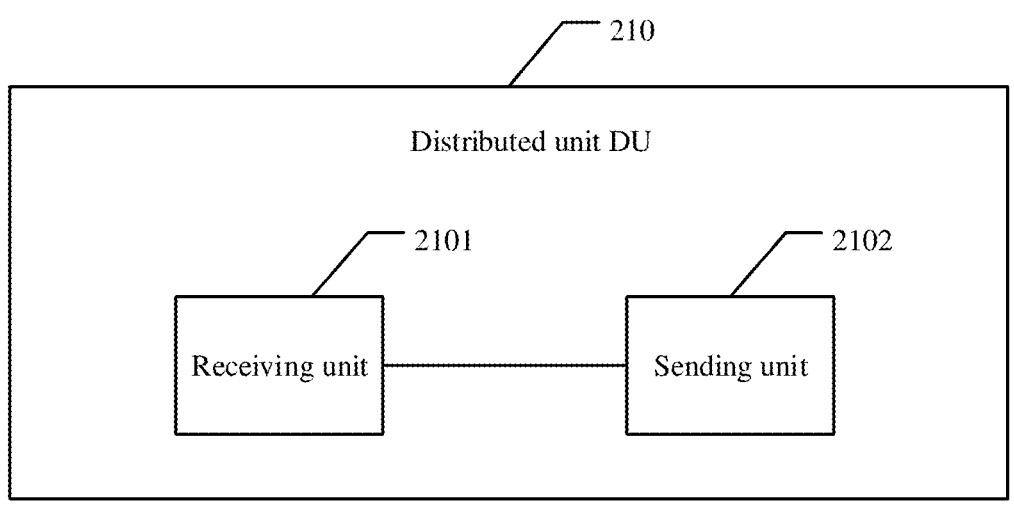
FIG. 21 is a schematic diagram of an embodiment of a distributed unit DU according to this application.

Refer to FIG. 21, a distributed unit 210 in an embodiment of this application may include: a receiving unit 2101 and a sending unit 2102.

In an implementation process, the sending unit 2102 is configured to send a first message to a centralized unit CU, where the first message includes a first transport block size TBS threshold, and the first TBS threshold is used for early transmission of uplink data; the receiving unit 2101 is configured to receive uplink data sent by UE; and the sending unit 2102 is further configured to send the uplink data to the CU.

In a possible implementation, the sending unit 2102 is further configured to: send a second TBS threshold to the CU, where the second TBS threshold is used for early transmission of downlink data.

In a possible implementation, the sending unit 2102 is further configured to: send a first indication to the CU, where the first indication is used to indicate early transmission of uplink data.

In a possible implementation, the sending unit 2102 is specifically configured to send initial uplink RRC message transfer to the CU, and the initial uplink RRC message transfer includes the second TBS threshold and/or the first indication.

In a possible implementation, if the initial uplink RRC message transfer includes the second TBS threshold or the first indication, the sending unit 2102 is further configured to send a UE context setting request to the CU.

In a possible implementation, the receiving unit 2101 is further configured to: receive a second indication sent by the CU, where the second indication is used to indicate early transmission of uplink data or early transmission of downlink data.

In a possible implementation, the receiving unit 2101 is further configured to: receive a second message sent by the CU, where the second message carries an RRC message and the second indication, and the second message includes downlink RRC message transfer or a UE context release command.

In a possible implementation, the sending unit 2102 is further configured to: send a third indication to the CU, where the third indication is used to indicate failure of early transmission of uplink data, or fallback of early transmission of uplink data, or failure of early transmission of downlink data, or fallback of early transmission of downlink data.

In another implementation, the receiving unit 2101 is configured to receive a first indication sent by a centralized unit CU, where the first indication includes an indication about downlink data to target UE; and the sending unit 2102 is configured to send an identifier of the target UE to the CU.

In a possible implementation, the receiving unit 2101 is specifically configured to: receive a paging message sent by the CU, where the paging message includes the first indication.

In a possible implementation, the sending unit 2102 is further configured to: send a first TBS threshold to the CU, where the first TBS threshold is used for early transmission of downlink data.

In a possible implementation, the indication about the downlink data to the target UE includes a data volume of downlink data.

It should be noted that content such as information exchange and an execution process between the modules of the distributed unit DU 210 is similar to that in the method embodiments of this application. For specific content, refer to the descriptions in the method embodiments of this application. Details are not described herein again.

An embodiment of this application further provides a base station. The base station may include a centralized unit CU and a distributed unit DU. For specific content such as information exchange and an execution process between the CU and the DU in the base station, refer to the descriptions in the method embodiments described in the embodiments in FIG. 9 to FIG. 19.

An embodiment of this application further provides a chip system. The chip system includes a processor, configured to support the centralized unit CU to implement a related function, for example, receiving or processing the data in the foregoing method embodiments. In a possible design, the chip system further includes a memory. The memory is configured to store program instructions and data that are necessary for a terminal device. The chip system may include a chip, or may include a chip and another discrete component.

An embodiment of this application further provides a chip system. The chip system includes a processor, configured to support the distributed unit DU to implement a related function, for example, receiving or processing the data in the foregoing method embodiments. In a possible design, the chip system further includes a memory. The memory is configured to store program instructions and data that are necessary for a terminal device. The chip system may include a chip, or may include a chip and another discrete component.

An embodiment of this application further provides a computer-readable storage medium. The computer-readable storage medium stores computer-executable instructions. When at least one processor of a device executes the computer-executable instructions, the device performs the methods described in the embodiments in FIG. 9 to FIG. 19.

Another embodiment of this application further provides a computer program product. The computer program product includes computer-executable instructions, and the computer-executable instructions are stored in a computer-readable storage medium. At least one processor of a device may read the computer-executable instructions from the computer-readable storage medium. When the at least one processor executes the computer-executable instructions, the device performs the methods described in the embodiments in FIG. 9 to FIG. 19.

A person skilled in the art may clearly understand that, for the purpose of convenient and brief description, for a detailed working process of the foregoing system, apparatus, and unit, reference may be made to a corresponding process in the foregoing method embodiments. Details are not described herein again.

In the several embodiments provided in embodiments of this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may or may not be physical units, that is, they may be located in one position, or may be distributed on a plurality of network units. Some or all of the units may be selected according to actual requirements to achieve the objectives of the solutions in the embodiment.

In addition, function units in embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A data transmission method, comprising:
   receiving, by a centralized unit (CU), a first message from a distributed unit (DU), wherein the first message comprises a first transport block size (TBS) threshold, the first TBS threshold is useable for early transmission of uplink data, and the CU and DU are separated;
   sending, by the CU, the first TBS threshold to a user equipment (UE), wherein the UE and DU are separated; and
   receiving, by the CU, uplink data from the UE based on the first TBS threshold.

2. The method according to claim 1, wherein the method further comprises:
   receiving, by the CU, a second TBS threshold from the DU, wherein the second TBS threshold is usable for early transmission of downlink data.

3. The method according to claim 1, wherein the method further comprises:

receiving, by the CU, a first indication from the DU, wherein the first indication is useable to indicate early transmission of uplink data.

4. The method according to claim 2, wherein the method further comprises:

receiving, by the CU, an initial uplink radio resource control (RRC) message transfer from the DU, wherein the initial uplink RRC message transfer comprises at least one of the second TBS threshold or the first indication.

5. The method according to claim 4, wherein the method further comprises:

sending, by the CU, a UE context setting request to the DU.

6. A data transmission method, comprising:

sending, by a distributed unit (DU), a first message to a centralized unit (CU), wherein the first message comprises a first transport block size (TBS) threshold, the first TBS threshold is useable for early transmission of uplink data, and the CU and DU are separated;

receiving, by the DU, uplink data from a user equipment (UE), wherein the DU and UE are separated; and sending, by the DU, the uplink data to the CU.

7. The method according to claim 6, wherein the method further comprises:

sending, by the DU, a second TBS threshold to the CU, wherein the second TBS threshold is usable for early transmission of downlink data.

8. The method according to claim 6, wherein the method further comprises:

sending, by the DU, a first indication to the CU, wherein the first indication is useable to indicate early transmission of uplink data.

9. The method according to claim 7, wherein the method further comprises:

sending, by the DU, an initial uplink radio resource control (RRC) message transfer to the CU, and the initial uplink RRC message transfer comprises at least one of the second TBS threshold or the first indication.

10. The method according to claim 9, wherein the method further comprises:

sending, by the DU, a UE context setting request to the CU.

11. A centralized unit (CU), comprising a receiver, and a transmitter, wherein the receiver is configured to receive a first message from a distributed unit (DU), wherein the first message comprises a first transport block size (TBS) threshold, the first TBS threshold is useable for early transmission of uplink data, and the DU and CU are separated;

the transmitter is configured to send the first TBS threshold to a user equipment (UE), wherein the UE is different from the DU; and the receiver is further configured to receive uplink data from the UE based on the first TBS threshold.

12. The CU according to claim 11, wherein the receiver is further configured to:

receive a second TBS threshold from the DU, wherein the second TBS threshold is useable for early transmission of downlink data.

13. The CU according to claim 11, wherein the receiver is further configured to:

receive a first indication from the DU, wherein the first indication is useable to indicate early transmission of uplink data.

14. The CU according to claim 12, wherein the receiver is further configured to:

receive an initial uplink radio resource control (RRC) message transfer from the DU, wherein the initial uplink RRC message transfer comprises at least one of the second TBS threshold or the first indication.

15. The CU according to claim 14, wherein the transmitter is further configured to:

send a UE context setting request to the DU.

16. The CU according to claim 11, wherein the transmitter is further configured to:

send a second indication to the DU, wherein the second indication is useable to indicate early transmission of uplink data or early transmission of downlink data.

17. The CU according to claim 16, wherein the transmitter is further configured to:

send a second message to the DU, wherein the second message includes a radio resource control (RRC) message and the second indication, and the second message comprises a downlink RRC message transfer or a UE context release command.

18. The CU according to claim 16, wherein the receiver is further configured to:

receive a third indication from the DU, wherein the third indication is useable to indicate:

failure of early transmission of uplink data, fallback of early transmission of uplink data, failure of early transmission of downlink data, or fallback of early transmission of downlink data.

* * * * *